US011153537B2

(12) United States Patent
Torres et al.

(10) Patent No.: US 11,153,537 B2
(45) Date of Patent: Oct. 19, 2021

(54) PRIVACY SHIELD FOR UNMANNED AERIAL SYSTEMS

(71) Applicant: AeroVironment, Inc., Monrovia, CA (US)

(72) Inventors: Gabriel E. Torres, Simi Valley, CA (US); Steven B. Chambers, Simi Valley, CA (US); Carlos Augusto Coronado, Northridge, CA (US); Gordon Bryan Hudson, Simi Valley, CA (US); Peter De Baets, Encino, CA (US)

(73) Assignee: AEROVIRONMENT, INC., Arlington, VA (US)

(*) Notice: Subject to any disclaimer, the term of this patent is extended or adjusted under 35 U.S.C. 154(b) by 1078 days.

(21) Appl. No.: 14/519,016

(22) Filed: Oct. 20, 2014

(65) Prior Publication Data
US 2016/0373699 A1    Dec. 22, 2016

Related U.S. Application Data

(63) Continuation of application No. PCT/US2014/061244, filed on Oct. 17, 2014.
(Continued)

(51) Int. Cl.
*H04N 7/18* (2006.01)
*G06F 16/29* (2019.01)
(Continued)

(52) U.S. Cl.
CPC .......... *H04N 7/185* (2013.01); *B64C 39/024* (2013.01); *G05D 1/0038* (2013.01); *G05D 1/0094* (2013.01); *G06F 16/29* (2019.01); *G06K 9/0063* (2013.01); *G06K 9/00771* (2013.01); *G08G 1/04* (2013.01); *H04N 5/23206* (2013.01); *H04N 5/23245* (2013.01); *H04N 5/77* (2013.01); *B64C 2201/127* (2013.01)

(58) Field of Classification Search
CPC ....................................... H04N 7/185
See application file for complete search history.

(56) References Cited

U.S. PATENT DOCUMENTS 4,405,943 A * 9/1983 Kanaly ................. G01S 5/0009
                                                   348/E7.088
6,130,705 A * 10/2000 Lareau ..................... G01C 3/08
                                                   348/144
(Continued)

OTHER PUBLICATIONS

International Search Report for Serial No. PCT/US14/61244 dated Feb. 5, 2016.

*Primary Examiner* — Christopher S Kelley
*Assistant Examiner* — Asmamaw G Tarko
(74) *Attorney, Agent, or Firm* — Concept IP LLP; Pejman Yedidsion; Eric Aagaard

(57) ABSTRACT

A system having: a processor and addressable memory, where the processor is configured to: receive a geographic data defining a selected geographical area; receive an operating mode associated with the selected geographical area, where the received operating mode restricts at least one of: a viewing of a UAV data and a recording of the UAV data by at least one user device; and broadcast the UAV data to the at least one user device based on the selected geographical area and the received operating mode.

22 Claims, 17 Drawing Sheets

Related U.S. Application Data

(60) Provisional application No. 61/893,091, filed on Oct. 18, 2013.

(51) Int. Cl.
| | | |
|---|---|---|
| *G05D 1/00* | (2006.01) | |
| *G08G 1/04* | (2006.01) | |
| *H04N 5/232* | (2006.01) | |
| *B64C 39/02* | (2006.01) | |
| *G06K 9/00* | (2006.01) | |
| *H04N 5/77* | (2006.01) | |

(56) References Cited

U.S. PATENT DOCUMENTS

| | | | |
|---|---|---|---|
| 7,460,148 B1* | 12/2008 | Clark | H04N 7/183 |
| | | | 340/539.13 |
| 2002/0008758 A1* | 1/2002 | Broemmelsiek | G01S 3/7864 |
| | | | 348/143 |
| 2005/0007456 A1* | 1/2005 | Lee | H04M 1/72577 |
| | | | 348/207.99 |
| 2006/0148418 A1* | 7/2006 | Purkayastha | H04N 7/1675 |
| | | | 455/73 |
| 2009/0210109 A1* | 8/2009 | Ravenscroft | G01C 21/005 |
| | | | 701/26 |
| 2012/0237028 A1* | 9/2012 | Khazan | G05D 1/0022 |
| | | | 380/201 |
| 2013/0303149 A1* | 11/2013 | Bocking | G03B 17/00 |
| | | | 455/418 |

\* cited by examiner

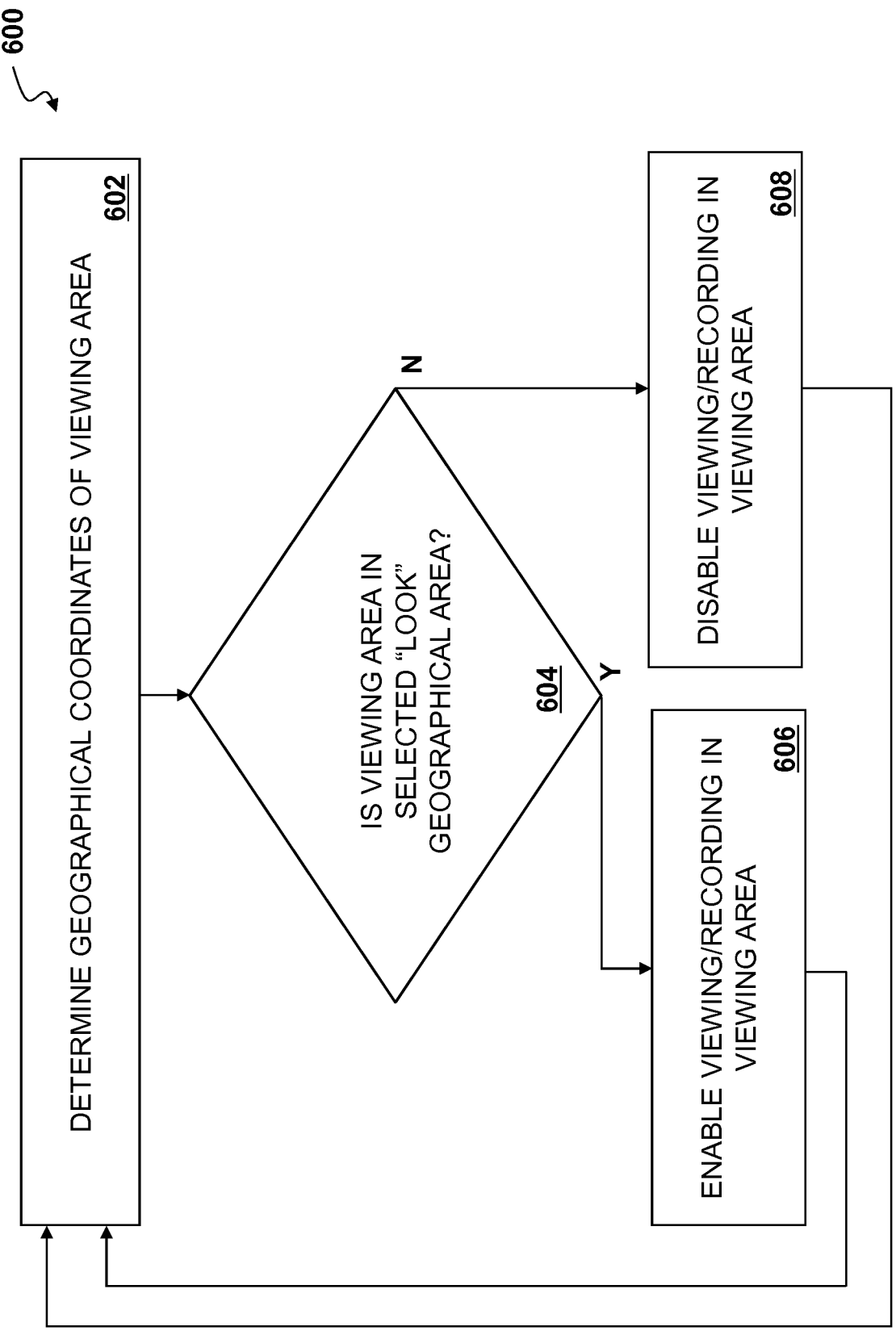

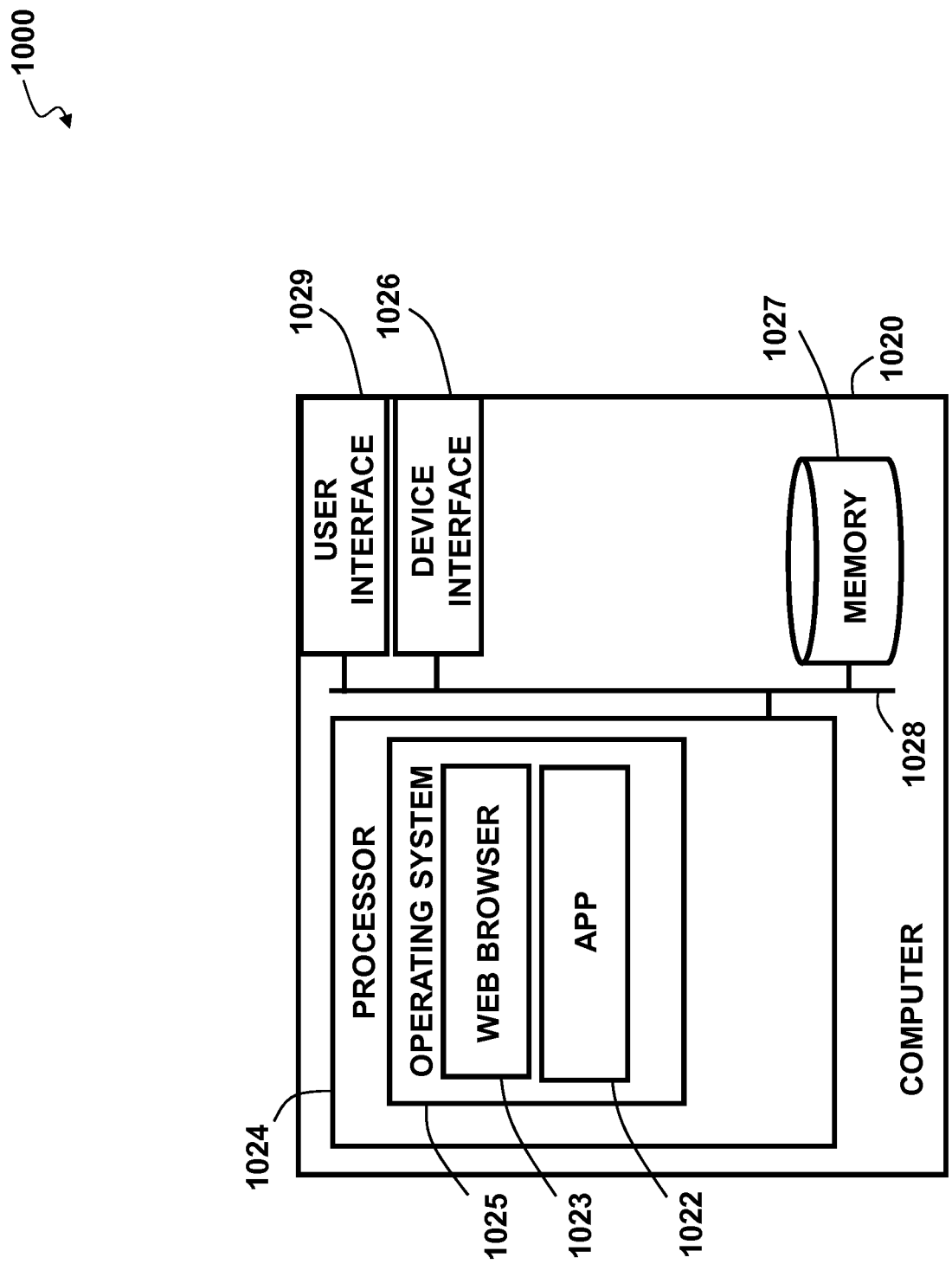

PRIVACY SHIELD FOR UNMANNED AERIAL SYSTEMS

CROSS-REFERENCE TO RELATED APPLICATIONS

This application is a continuation of International Application No. PCT/US14/61244, filed Oct. 17, 2014, which claims priority to and the benefit of U.S. Provisional Application No. 61/893,091, filed Oct. 18, 2013, the disclosures of which are incorporated by reference herein for all purposes.

TECHNICAL FIELD

The invention, in its several embodiments, pertains to Unmanned Aerial Systems (UAS), and more particularly to UAS having video imaging capability for use in surveillance and surveying.

BACKGROUND

Aerial surveillance and surveying have typically been relatively expensive endeavors, requiring manned helicopters or airplanes, and requiring commercially licensed pilots to fly them. With an increase in the use of UAS having video capabilities, there exists an opportunity to drastically reduce the cost of such surveillance and surveying and without the need for licensed commercial pilots. With such reduced cost and licensing, the pervasiveness of such flights is forecast to greatly increase. Unfortunately, this has created concern in the general public about potential privacy abuses from governmental and commercial aerial surveillance. A need exists to reduce public concerns and to create effective controls for reducing the opportunity for privacy abuses.

SUMMARY

Some embodiments of the present invention may include a system having: a processor and addressable memory, where the processor may be configured to: receive a geographic data defining a selected geographical area; receive an operating mode associated with the selected geographical area, where the received operating mode may restrict at least one of: a viewing of a UAV data and a recording of the UAV data by at least one user device; and broadcast the UAV data to the at least one user device based on the selected geographical area and the received operating mode. In additional system embodiments, the UAV data may have at least one of: a video stream from a UAV imager and a metadata associated with the video stream from the UAV imager. In additional system embodiments, the first processor may be further configured to: determine a field of view of the UAV imager; and determine if the field of view of the UAV imager is within the selected geographical area. In other system embodiments, the field of view of the UAV imager may be based on a center field of view of the UAV or it may be based on four corners of the video stream of the UAV imager. In additional system embodiments, the received operating mode may restrict viewing the UAV data, by the at least one user device, if any portion of the determined field of view of the UAV imager is within the selected geographical area. In other system embodiments, the received operating mode may restrict viewing the UAV data, by the at least one user device, if no portion of the determined field of view of the UAV imager is within the selected geographical area. In other system embodiments, the received operating mode may restrict viewing a portion of the UAV data, by the at least one user device, if the determined field of view of the UAV imager is partially within the selected geographic area and partially not within the selected geographic area, where the restricted viewing portion of the UAV data may be one of: the field of view inside the selected geographic area and the field of view outside the selected geographic area. In other system embodiments, the received operating mode may restrict recording the UAV data, by the at least one user device, if any portion of the determined field of view of the UAV imager is within the selected geographical area. In other system embodiments, the received operating mode may restrict recording the UAV data, by the at least one user device, if the determined field of view of the UAV imager is not within the selected geographical area. In other system embodiments, the received operating mode may restrict recording a portion of the UAV data, by the at least one user device, if the determined field of view of the UAV imager is partially within the selected geographical area and partially not within the selected geographical area, wherein the restricted recording portion of the UAV data is one of: the field of view inside the selected geographical area and the field of view outside the selected geographical area.

An exemplary method embodiment of the present invention may include a method involving: selecting, by an operator of a Ground Control System (GCS) having a processor and addressable memory, a geographical area; selecting, by the operator of the GCS, an operating mode to associate with the geographical area; sending, by the operator of the GCS, the selected geographical area and selected operating mode to a processor of a UAV having addressable memory; determining, by the processor of the UAV, a field of view of a UAV imager; and broadcasting, by the processor of the UAV, a UAV data defining the selected geographical area, the selected operating mode, and the field of view of the UAV imager to at least one user device; where the selected operating mode may restrict at least one of: a viewing of the UAV data and a recording of the UAV data by the least one user device. In additional method embodiments, the UAV data may have at least one of: a video stream from the UAV imager and a metadata associated with the video stream from the UAV imager. In other method embodiments, the selected operating mode may restrict viewing the UAV data, by the at least one user device, if the determined field of view of the UAV imager includes any area inside of the selected geographical area. In other method embodiments, the selected operating mode may restrict viewing the UAV data, by the at least one user device, if the determined field of view of the UAV imager includes any area outside of the selected geographical area. In other method embodiments, the selected operating mode may restrict viewing a portion of the UAV data, by the at least one user device, if the determined field of view of the UAV imager includes an area inside the selected geographic area and an area outside the selected geographic area, where the restricted portion of the UAV data may be one of: the area inside the selected geographic area and the area outside the selected geographic area. In other method embodiments, the selected operating mode may restrict recording the UAV data, by the at least one user device, if the determined field of view of the UAV imager includes any area inside of the selected geographical area. In other method embodiments, the selected operating mode may restrict recording the UAV data, by the at least one user device, if the determined field of view of the UAV imager includes any area outside of the selected geographical area. In other method embodiments, the selected operating mode may restrict recording a portion of the UAV data, by the at least one user device, if the determined field of view of the UAV imager includes an area inside the selected geographical area and an area outside the geographical area, wherein the restricted portion of the UAV data may be one of: the area inside the selected geographical area and the area outside the selected geographic area. Other method embodiments may further have selecting, by the operator of the GCS, a geographical point to direct a center field of view of the UAV imager. Other method embodiments may further have inverting, by the operator of the GCS, any areas where at least one of: viewing of the UAV data and recording of the UAV data by the at least one user device are restricted with any areas where at least one of: viewing of the UAV data and recording of the UAV data by the at least one user device are allowed.

An additional exemplary system embodiment may include a system having: a processor and addressable memory, where the processor may be configured to: receive, from at least one database, metadata containing information on one or more geographical areas where at least one UAV imager has at least one of: viewed the one or more geographical areas and recorded the one or more geographical areas; receive, by a user, a geographic data defining a selected geographical area; determine if the selected geographical area was at least one of: viewed and recorded based on the received metadata on one or more geographical areas; receive, by the user, a request to prevent at least one of: viewing the selected geographical area and recording the selected geographical area by the at least one UAV imager; and update the at least one database with the received request.

BRIEF DESCRIPTION OF THE DRAWINGS

Embodiments of the present invention are illustrated by way of example and not limitation in the figures of the accompanying drawings, which may not be drawn to scale, and in which:

FIG. 6 depicts an exemplary functional block diagram of a "look" operating mode determination to enable or disable recording or viewing within a selected geographical area;

FIG. 10 illustrates an exemplary top level functional block diagram of a computing device embodiment of a GCS, UAV, post-processing computer, and/or one or more user devices.

DETAILED DESCRIPTION

The present invention may allow an operator of an Unmanned Aerial System (UAS), such as an Unmanned Aerial Vehicle (UAV), to set restrictions on that operator's ability to view and/or record UAV data from that UAV as well as restrictions on one or more additional users that desire to view and/or record the UAV data. The operator may select a geographical area, which may be defined by geographic data, and an operating mode associated with the selected geographical area. This operating mode may be used to restrict viewing and/or recording of UAV data from the UAV to at least one user device. This UAV data may include a video stream and/or metadata from a UAV imager and/or sensor. By restricting this UAV data based on the selected geographical area, selected operating mode, and user settings, the operator may respect privacy concerns regarding UAV operation among certain users as needed.

Figure 1A:
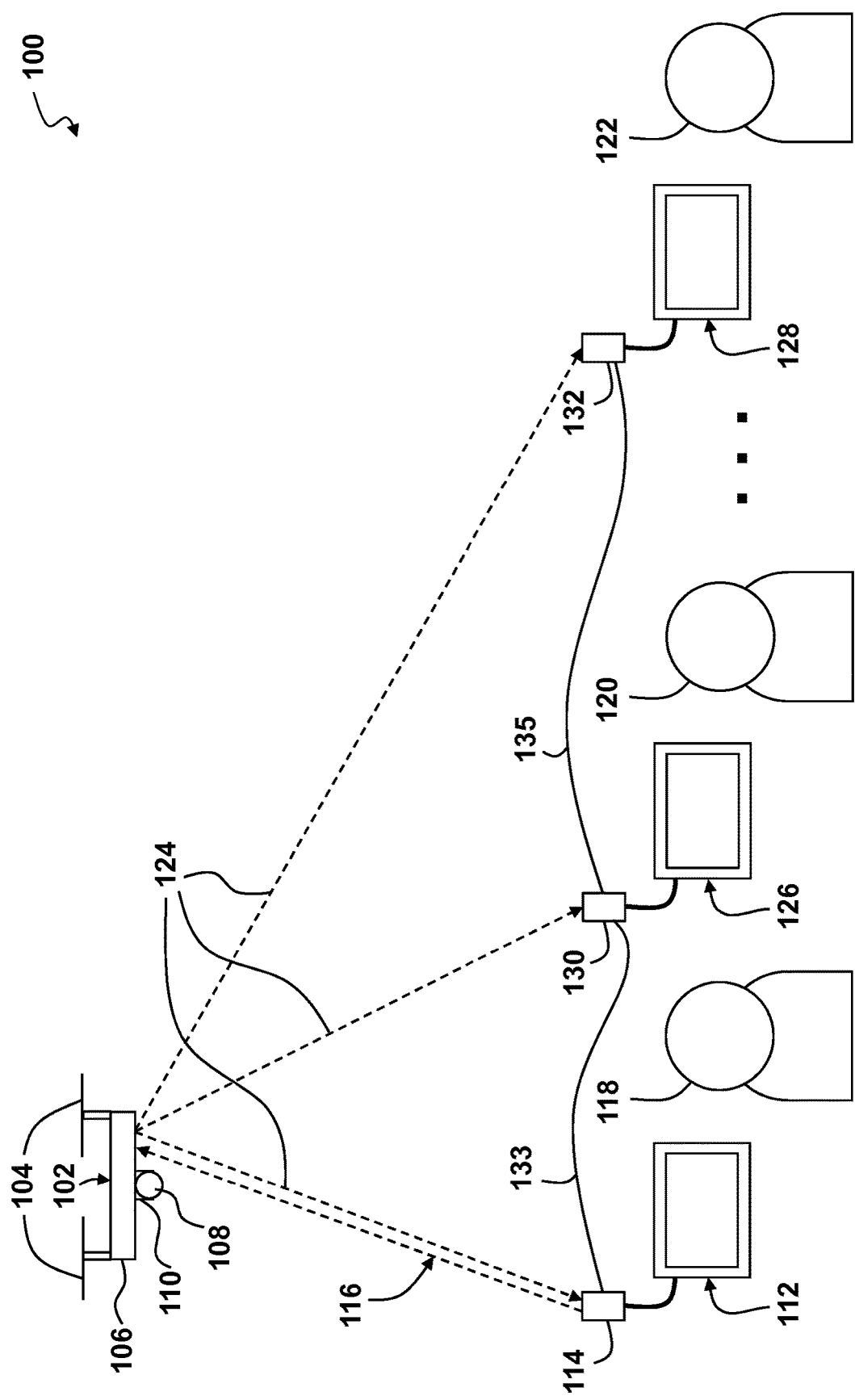
FIG. 1A depicts an embodiment of an Unmanned Aerial System (UAS) having an Unmanned Aerial Vehicle (UAV) to broadcast data to multiple users.

FIG. 1A depicts an exemplary UAS system embodiment 100 that uses a UAV to broadcast UAV data having a video stream and/or metadata to multiple users. The system 100 may include a UAS, such as UAV 102. The UAV 102 may contain one or more propellers 104 connected to a chassis 106 to enable the UAV 102 to hover in a relatively stationary position. In some embodiments, the UAV 102 may be a fixed wing vehicle that does not hover (not shown). The UAV 102 may contain one or more imagers 108, e.g., a camera that may be supported by a gimbal mount 110. This gimbal mount 110 may be rotated, panned, and/or pitched relative to the UAV 102 to allow the imager 108 to capture images of varying aspects of the surrounding landscape, e.g., crops, roads, rivers, buildings, etc. The UAV 102 may maintain focus and center field of view on an aspect of the landscape, e.g., due to movement of the UAV 102 by wind or other forces, by adjusting the one or more propellers 104 and/or adjusting the gimbal mount 110. In some embodiments, the imager 108 may be fixed in pan relative to the UAV 102, and panning may be accomplished by rotating and/or yawing of the UAV 102. The UAV 102 may include one or more sensors in place of, or in addition to, the imager 108 of the UAV 102, such as an infrared (IR) camera, a Lidar, a motion sensor, a Chemical Biological Radiological Nuclear (CBRN) sensor, and/or a radar. The UAV may use these sensors and/or the imager 108 to broadcast UAV data having a video stream and/or metadata that may be recorded. The recorded metadata is associated with the video stream and may adhere to a metadata standard, e.g., Motion Imagery Standards Board (MISB) Engineering Guideline (EG) 0104. This metadata may include information on the location of the UAV 102; the location being viewed by the imager 108, e.g., the imager 108 center field of view location and/or the locations of the four corners of the captured image; and/or whether video recording is enabled.

The system 100 may also include a Ground Control System (GCS) 112 having a ground radio such as a digital data link (DDL) 114 (in embodiments the radio 114 may be a DDL radio system available from Aerovironment, Inc. of Monrovia Calif.) for communicating 116 with the UAV 102. In some embodiments, the GCS 112 may have an integrated transceiver and antenna (not shown). The GCS 112 may be controlled by an operator 118. The operator 118 may set restrictions on the ability of the UAV 102 and/or GCS 112 to record video based on the area being viewed by the imager 108 and/or associated metadata. The operator 118 may also control the movement of the UAV 102 and the imager 108 imaging direction through gimbal mount 110 movements transmitted by the GCS 112. The operator 118 may have the ability to view and/or record video and/or metadata from the UAV 102 imager 108.

The system 100 may also include one or more additional users (120, 122). The UAV may broadcast 124 video and/or metadata to the additional users (120, 122) through one or more additional viewing and/or recording devices (126, 128). These additional viewing and/or recording devices (126, 128) may each have ground radios (130, 132) for receiving the broadcast 124 from the UAV 102. These additional users (120, 122) may have different permissions to view and/or record video and/or metadata that is broadcasted 124 by the UAV 102. For example, the first additional user 120 may be a public safety officer, e.g., police officer, fireman, etc., that may have the permission to view video and metadata, but not record this information. The second additional user 122 may be a news crew that may have the permission to record video, but only if the UAV 102 imager 108 is capturing video of an approved geographical area, which may be defined by geographic data, which may be set by the operator 118 via the GCS 112. If the UAV 102 imager 108 is capturing video of a scene outside this area, the second additional user 122 may be presented with a blank image, a blurred image, a degraded image (such as a reduced resolution or defocused image), or a message that viewing and/or recording is disabled instead of an original captured video stream. Such blurring and/or degrading may be of all or a portion, or portions, of the image. User 120, 122 permissions may be based on a logged-in username, ground radio (130, 132) ID, and/or device (126, 128) ID. User (120, 122) permissions may also be tied to the level of restrictions on viewing and/or recording by the devices (126, 128). For example, a public safety officer may be able to view an area, but signs and/or faces may be blurred to a level where identification is not possible. A news crew may have the entire region blurred out by the ground radio (130, 132) ID, and/or device (126, 128) ID. Restricting or degrading the view of a news crew may be done to prevent public display of police locations during events such as a search for a suspect, or the like. In some embodiments, the level of blur or degrading may be varied in intensity based on permissions and/or the object to be blurred or degraded, e.g., a face may require a greater intensity of blurring than a road. In some embodiments, blur or degrading may only be applied to distinguishing features; blur may allow the identification of people and vehicles (e.g. license plates); a blur may be placed over defined items or areas, such as over windows to a house to prevent viewing or recording the interior of a house; and/or blur may make it possible for a user (120, 122) to only determine the difference between daytime and nighttime.

In some embodiments, the transmission of the signals to the additional users 120 and 122, may be done via a hardwired cable(s) (135, 136), over a network, over the internet and/or via broadcast from the transmitter 114.

Figure 1B:
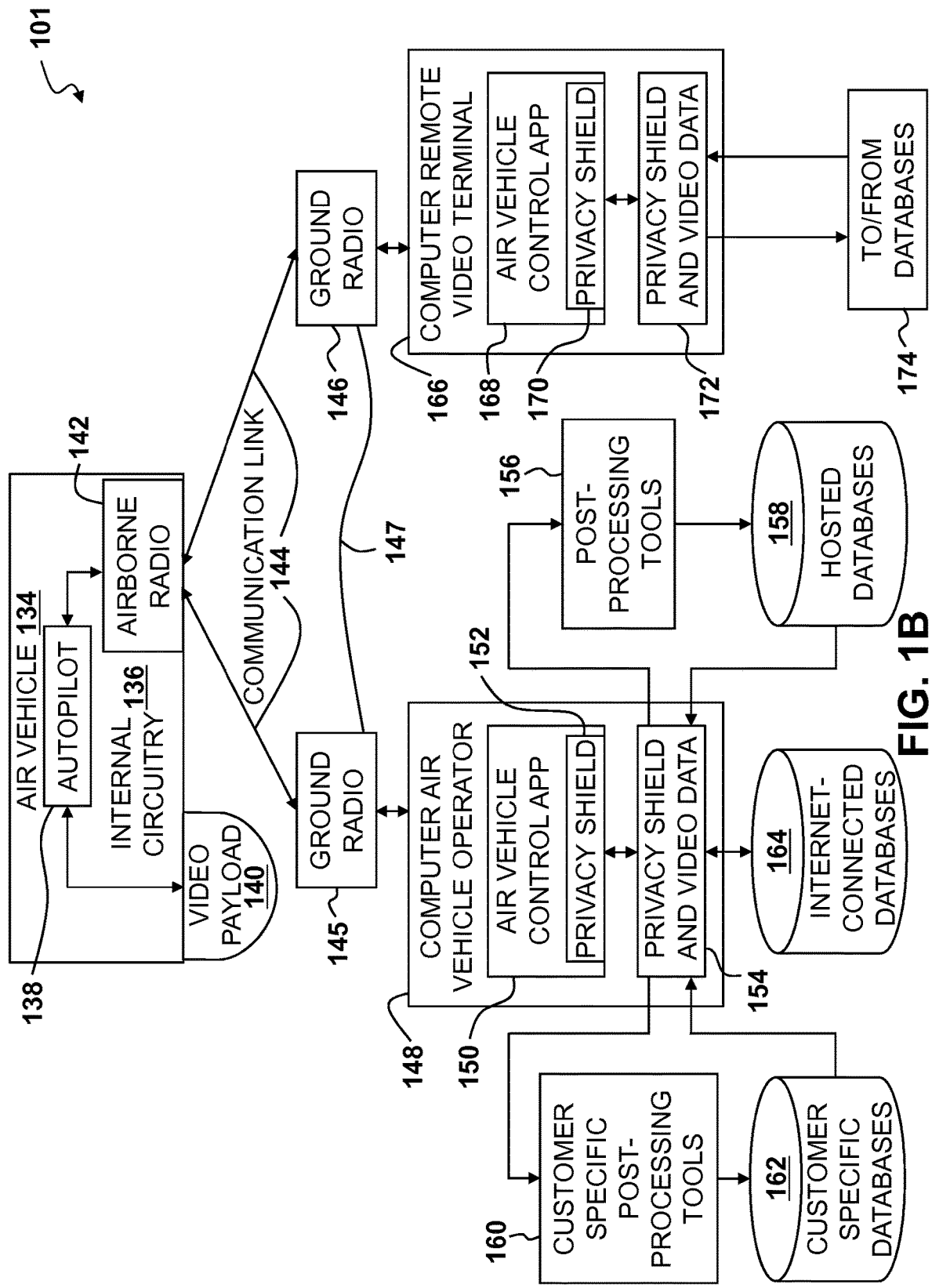
FIG. 1B depicts an embodiment of a UAS having an air vehicle to broadcast data from a video payload to multiple terminals interacting with multiple databases.

FIG. 1B depicts another exemplary UAS system embodiment 101 that uses an air vehicle to communicate UAV data from a video payload to multiple computer remote video terminals. The system 101 may include an air vehicle 134 such as a UAV. The air vehicle 134 may include internal circuitry 136 such as a processor having addressable memory (See FIG. 10). This internal circuitry 136 may include an autopilot 138 to control the air vehicle 134, a video payload 140, e.g., an imager and related circuitry, and an airborne radio 142. The airborne radio 142 may be used to establish a communication link 144 to broadcast embedded data and messaging, e.g., instructions for the air vehicle 134 autopilot 138 and video payload 140. A ground radio 145 of a computer air vehicle operator 148 may be used to send and/or receive embedded data and messaging with the air vehicle 134. The computer air vehicle operator 148 may be a GCS having a processor with addressable memory. This processor may run an air vehicle control application 150 having a privacy shield feature 152. The privacy shield feature 152 may allow an operator to activate or deactivate one or more restrictions on that operator's ability to view and/or record UAV data, as well as to activate or deactivate one or more restrictions on one or more additional computer remote video terminals 166 to view and/or record the UAV data. The privacy shield feature 152 may interface with privacy shield and video data 154 and/or one or more tools or databases. The privacy shield and video data 154 may access one or more post-processing tools 156 that may access one or more hosted databases 158. These post-processing tools and/or hosted databases 158 may be accessed by the computer air vehicle operator 148 remotely and/or loaded into the computer air vehicle operator 148, e.g., as part of the GCS software and/or hardware. The privacy shield and video data 154 may also access one or more customer specific post-processing tools 160, e.g., third-party applications and/or plug-ins, which may access one or more customer specific databases 162. The privacy shield and video data 154 may also access one or more internet-connected databases 164. These databases may contain rules, records, or restrictions, e.g., a database of laws based on geographical areas, a database of property boundaries such as a parcel map, a database of "do not record" areas, and/or a database of areas that have been viewed and/or recorded by a UAS such as a UAV having an imager.

The UAS system 101 may also include a second radio 146 connected to a computer remote video terminal 166, e.g., an additional user (See FIG. 1A). The second radio 146 and video terminal 166 could be the additional user radios and terminals (as identified as the ground radios having the IDs 130 and 132, and devices having the IDs 126 and 128). The computer remote video terminal 166 may include a processor having addressable memory. This processor may run an air vehicle control application 168, which may have limited features as compared to the air vehicle control application 150 of the computer air vehicle operator 148. This air vehicle control application 168 may have a privacy shield feature 170. This privacy shield feature 170 may allow an additional user, via the computer remote video terminal 166, to view and/or record UAV data based on an operator's activation or deactivation of one or more restrictions in the privacy shield feature 152 of the computer air vehicle operator 148. This privacy shield 170 feature may interface with privacy shield and video data 172, which may communicate to and/or from one or more databases 174.

In embodiments, there may only be a communication link 144 between the air vehicle 134 and the ground radio 145, with a separate either hardwired or radio broadcast radio communication link 147 between the GCS 148 and the radio 146.

Figure 2:
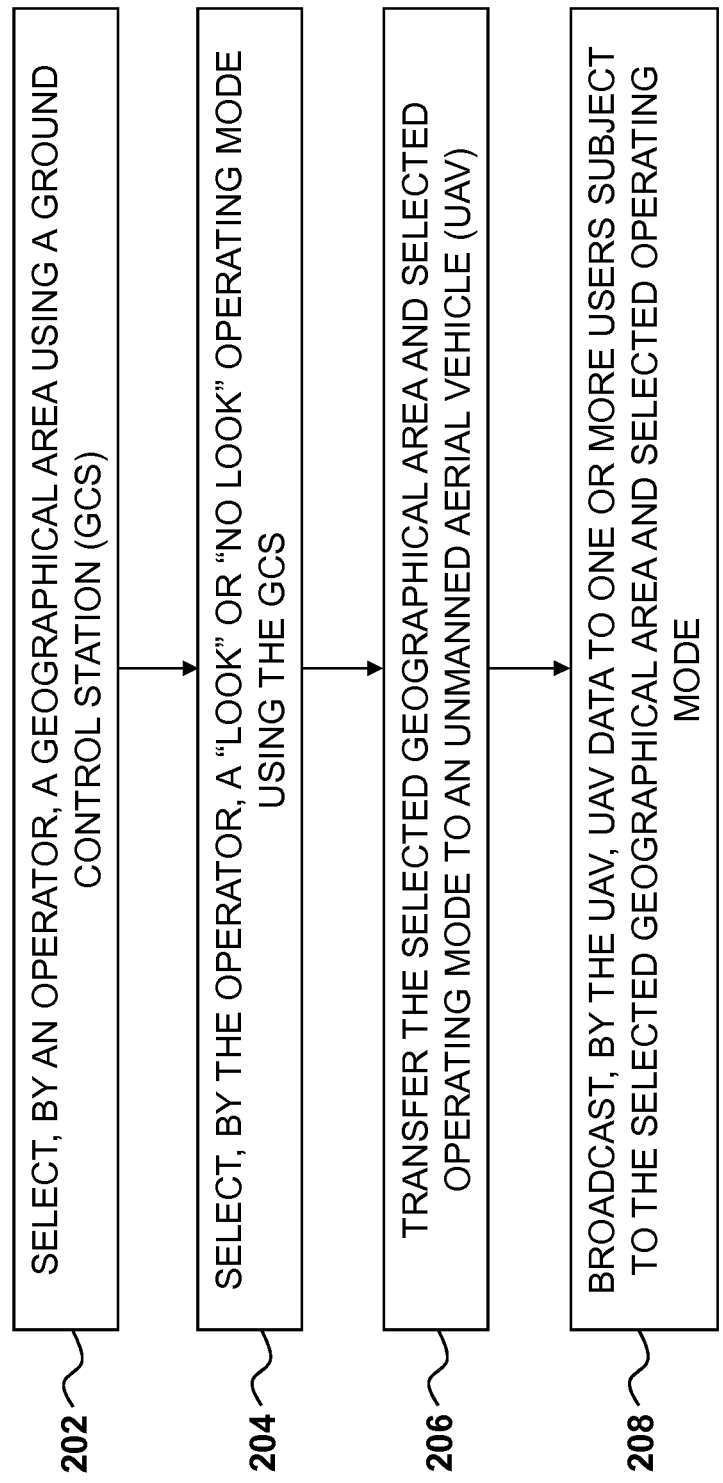
FIG. 2 depicts an exemplary functional block diagram of a system embodiment for broadcasting UAV data having restrictions on viewing and/or recording functionality to multiple users based on a defined geographical area and selected operating mode.

FIG. 2 depicts an exemplary functional block diagram of a system embodiment 200 for setting restrictions on what UAV data users may view and/or record. An operator may select one or more geographical areas using the GCS (step 202). The selected one or more geographical areas may be defined as geographic data by the GCS. These geographical areas may be selected by the operator prior to launching the UAV. In some embodiments, these geographical areas may be selected, or subsequently modified, by the operator once the UAV is already in flight. The one or more geographical areas may be selected via a map-based user interface (See FIG. 3). The operator may draw a polygon, or other shape, e.g., a circle, on a displayed map to select the boundaries of a selected geographical area. The selected geographical area may be a simple or complex shape. The operator may be able to modify the boundaries of the selected geographical area by dragging it, rotating it, and/or selecting and dragging one or more points of its boundary. The boundaries of the selected geographical area may stand out from the map to an operator, e.g., using dashed and/or colored lines. The selected geographical area may initially appear to an operator as a default shape, e.g., a diamond with four points having diagonals of a predetermined length, prior to any revisions of the boundary by the operator. After each movement of the boundaries of the selected geographical area, the GCS may verify that the operator has selected a valid geographical area. If a non-valid geographical area is attempted, the GCS may revert back to the last valid selected geographical area automatically.

The geographical area may also be selected by a non-graphical interface, e.g., using a series of coordinates and/or a center point with a defined radius. The selection of the geographical area may also be provided by one or more databases, e.g., a parcel map or property boundary database. Such a database may originate and/or be maintained by any of a variety of entities including those other than the operator of the UAV system. For example, a court may maintain a database of geographic of 'look' locations that have been approved for viewing/recording by police departments under search warrants the court issues. The UAV system and/or its operator would access this database prior to or during a flight via any of a variety of means including an internet connection.

In some embodiments, only one geographical area may be selected. In other embodiments, an operator may be able to add multiple geographical areas and/or combine these geographical areas together. The operator may also be able to save and/or download one or more default geographical areas. In some embodiments, the operator may be able to select a geographical area using a live video stream of the imager on the UAV, e.g., tapping on the screen may select geo-rectified points and populate a geographical area. In some embodiments, the geographical area may be a 3-D region, e.g., adding elevation data to a selected 2-D geographical area. The 3-D region may be used to block out the viewing of the highest object defined in an elevation limit and everything behind that object. This may be determined by calculating a geographical location of each of the four corners of the image area and then adding a vertical distance, e.g., using Digital Terrain Elevation Data (DTED), relative to the UAV altitude, and the distance from the four corners, that blocks out a given elevation.

The operator may then select, using the GCS, whether to activate a "look" mode or a "no look" operating mode (step 204). The GCS may initially default to one of these operating modes, e.g., a "no look" mode, for the selected geographical area. If an alternate operating mode is desired, the operator may be able to invert the current mode to change from a "look" mode to a "no look" mode, and vice versa. In some embodiments, the operator may select, via the GCS, which operating mode to activate. The GCS may then transfer the geographical area, which may be defined as geographic data by the GCS, and the selected operating mode to the UAV (step 206). The operator may choose to send the selected geographical area and the selected operating mode to the UAV, or the GCS may automatically update the UAV with the latest selected geographical area and selected operating mode. The selected geographical area and the selected operating mode may be stored in the UAV memory, as geographic data and a selected operating mode, and accessed by one or more processors of the UAV having addressable memory. In other embodiments, the selected geographical area and the selected operating mode may be retained on the GCS and used for control of the UAV camera and recording functions by the GCS. The UAV may then broadcast UAV data, which may contain video and/or metadata from one or more imagers and/or sensors, to one or more user devices subject to the selected geographical area and the selected operating mode (step 208). Depending on the permissions of the users, the selected geographical area, and selected operating mode, the user devices may be able to, or may not be able to, view and/or record video and/or metadata from the UAV imager and/or sensors.

The UAV may broadcast encrypted UAV data that may be unencrypted by a user device, e.g., a computer, tablet, phone, etc., subject to the restraints broadcast by the UAV and/or permissions set in the user device. For example, the user device may receive the entire encrypted data stream, but only be able to view and/or record this stream when certain conditions are met, e.g., the UAV imager field of view is inside a selected geographical area in "look" operating mode. These privacy shield features may be transferred to a future payload which has an on-board recording ability so that any "do not record" features are matched in the on-board recorded data.

Figure 3:
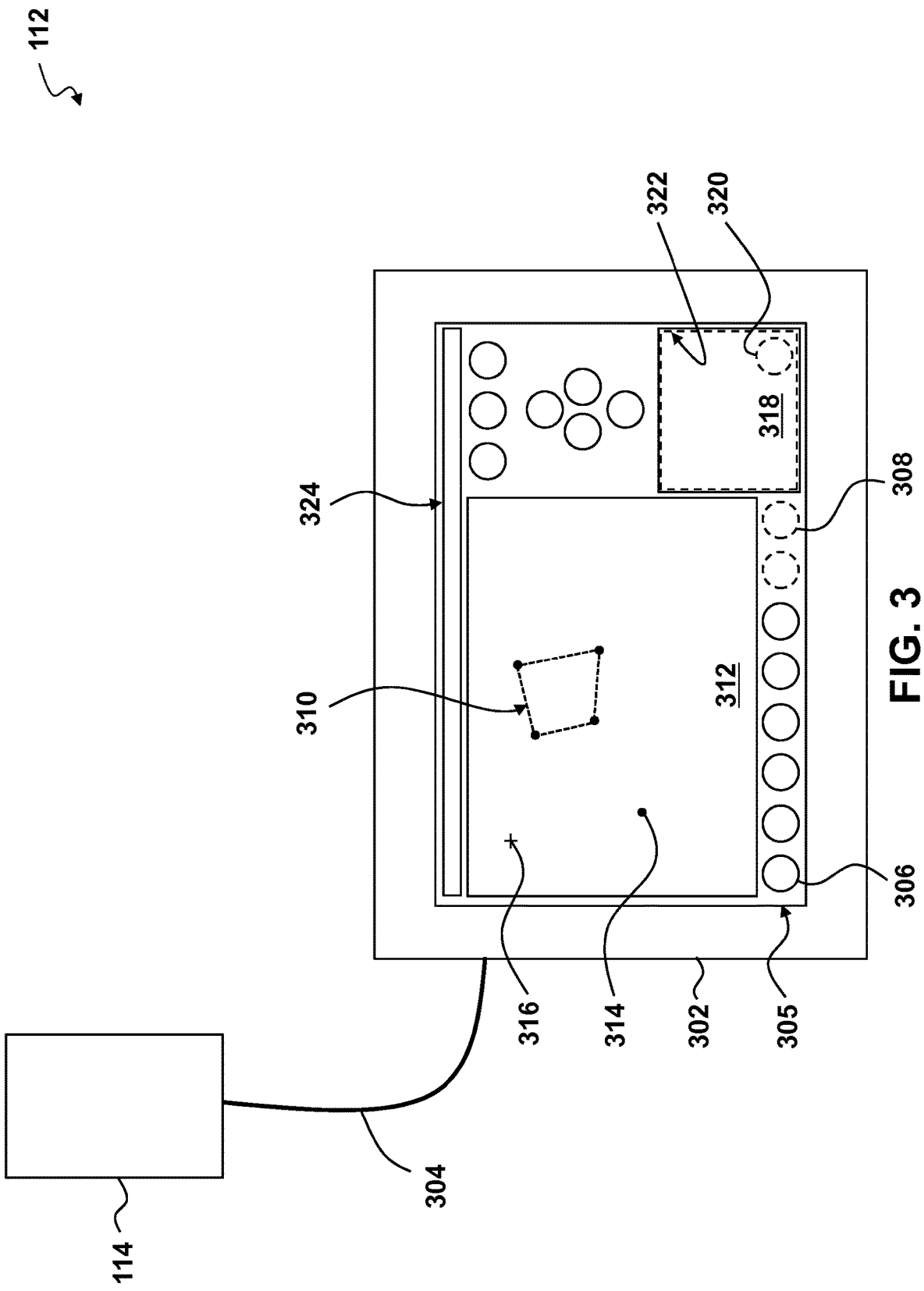
FIG. 3 depicts an exemplary Ground Control System (GCS) of an exemplary embodiment having a user interface for controlling functions for viewing and recording UAV data.

FIG. 3 depicts an exemplary Ground Control System (GCS) 112 having a user interface that may alert a user to a UAV viewing and/or recording status. The GCS may have a ground radio 114 for communicating with the UAV. The ground radio 114 may be connected to a computing device 302, e.g., a computer, tablet, or phone, via a data connection 304, e.g., an Ethernet cable. The computing device 302 may have a user interface 305, e.g., a touch screen. The user interface 305 may have one or more buttons 306 to allow operator input into the GCS 112. These buttons 306 may be part of a touchscreen interface and/or physical buttons. Pressing one or more of these buttons 306 may activate additional buttons 308 and/or options based on the current function in order to maximize screen real estate and avoid clutter when certain functions are not being used. The user interface 304 may have a map display 312 to allow an operator to see and select a location of the UAV 314, see and select a center field of view of an imager of the UAV 316, and/or see and select a geographical area 310. The operator may be able to move the UAV location 314, center field of view location 316, and/or selected geographical area 310 via the user interface 304, e.g., via one or more touch gestures.

The map display 312 may be of a map and/or satellite imagery. The selected geographical area 310 may be shaded, e.g., in a blue color, such that the space within the selected geographical area 310 is still visible to the operator of the GCS 112. In some embodiments, the selected geographical area 310 may be a moveable object, e.g., a car, and the selected geographical area 310 may track the movement of the moveable object, e.g., follow the car down a road. The selected geographical area 310 of such a moveable object may be a set region around the moveable object, e.g., a 100 yard range such that areas not pertinent to a car chase are not viewed and/or recorded.

The user interface 304 may also have a live stream of video 318 from the UAV imager. This live stream 318 may remain active to an operator of the UAV (such as the operator 118 of FIG. 1A) even when recording and/or viewing is otherwise disallowed in order to maintain operator situational awareness of the UAV and to improve the safety of operation of the UAV. The GCS 112 may record metadata describing the areas viewed by the operator even when recording is disabled. In some embodiments, this live stream 318 may match any restrictions on recording and/or viewing video and/or metadata. If the operator cannot view a live stream of video 318 on the GCS 112, the UAV may be controlled via operator line of sight, the UAV location 314 on the map interface 312, or other means, e.g., a preprogrammed UAV route. In some embodiments, whether the live stream 318 is always on or matches one or more restrictions may be set by the operator of the GCS 112. In embodiments where the live stream 318 matches these requirements, a static image may be placed inside the video stream 318 when the video stream 318 is in a do not record area, e.g., a shield logo and/or the words "Shielded Area." This shielding may be used to save processing power as compared to an embodiment which utilizes more CPU-intensive blurring of a do not record area. The live stream 318 may also provide feedback to an operator as to whether recording is occurring and/or allowed by the operator and/or one or more additional users. An icon 320 may appear during recording to indicate that recording is occurring. The GCS 112 may also notify the operator if recording is in any way suspended. In some embodiments, the live stream 318 may include a dashed border 322 around the video stream 318, e.g., in a blue color, that matches the line used to select the geographical area 310 in the map display 312.

The GCS 112 may also notify the operator if the GCS 112 and/or the UAV have encountered a problem, e.g., there is a difficulty with valid data and/or the slant range from the UAV to a center field of view location is too far to adequately resolve. If there is a problem, the live stream 318 may include a dashed border around the video stream 318 in an alternate color, e.g., yellow. The user interface 304 may also have one or more status indicators 324. These status indicators 324 may include information on the UAV health, signal strength, battery life of the UAV and/or GCS, altitude of the UAV, geographical position of the UAV and/or center field of view of the UAV imager, etc.

Figure 4:
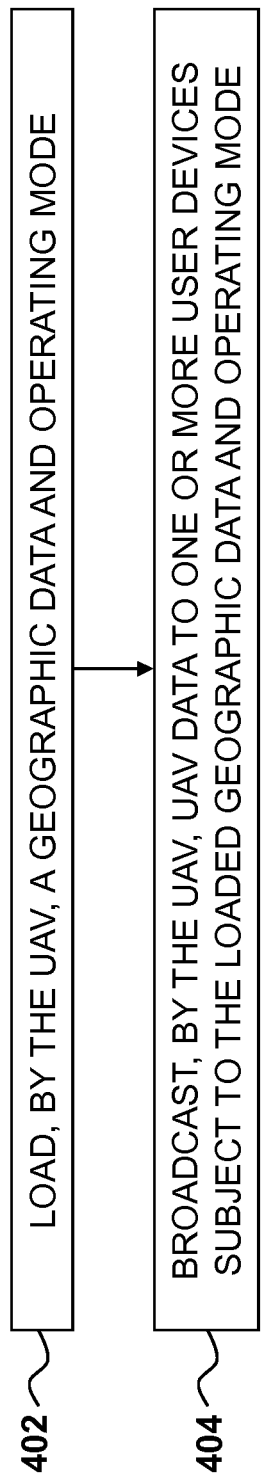
FIG. 4 depicts an exemplary functional block diagram of another system embodiment for pre-loading areas and operating modes on a UAV.

FIG. 4 depicts an exemplary functional block diagram of another system embodiment 400 that may be loaded and/or pre-loaded on a UAV and activated with and/or without additional user involvement. The UAV may load a geographic data and operating mode (step 402). The geographic data may define one or more geographical areas. The one or more geographical areas may be selected by an operator and/or be pre-loaded on the UAV. The operating mode associated with the geographic data may be selected by an operator and/or be pre-loaded on the UAV. The operating mode and/or geographic data may be stored in a UAV processor having addressable memory, and/or updated via one or more databases, e.g., an external database of "do not record" areas. The operating mode and/or geographic data pre-loaded by the UAV may depend on one or more factors, e.g., a geographical location of the UAV. The UAV may then broadcast UAV data, which may contain encrypted video and/or metadata from one or more UAV imagers and/or sensors, to one or more user devices subject to the loaded geographic data and operating mode (step 404). Depending on the permissions of the one or more user devices and the loaded operating mode and/or geographic data, the one or more user devices may be able to, or may not be able to, view and/or record the broadcast UAV data.

Figure 5A:
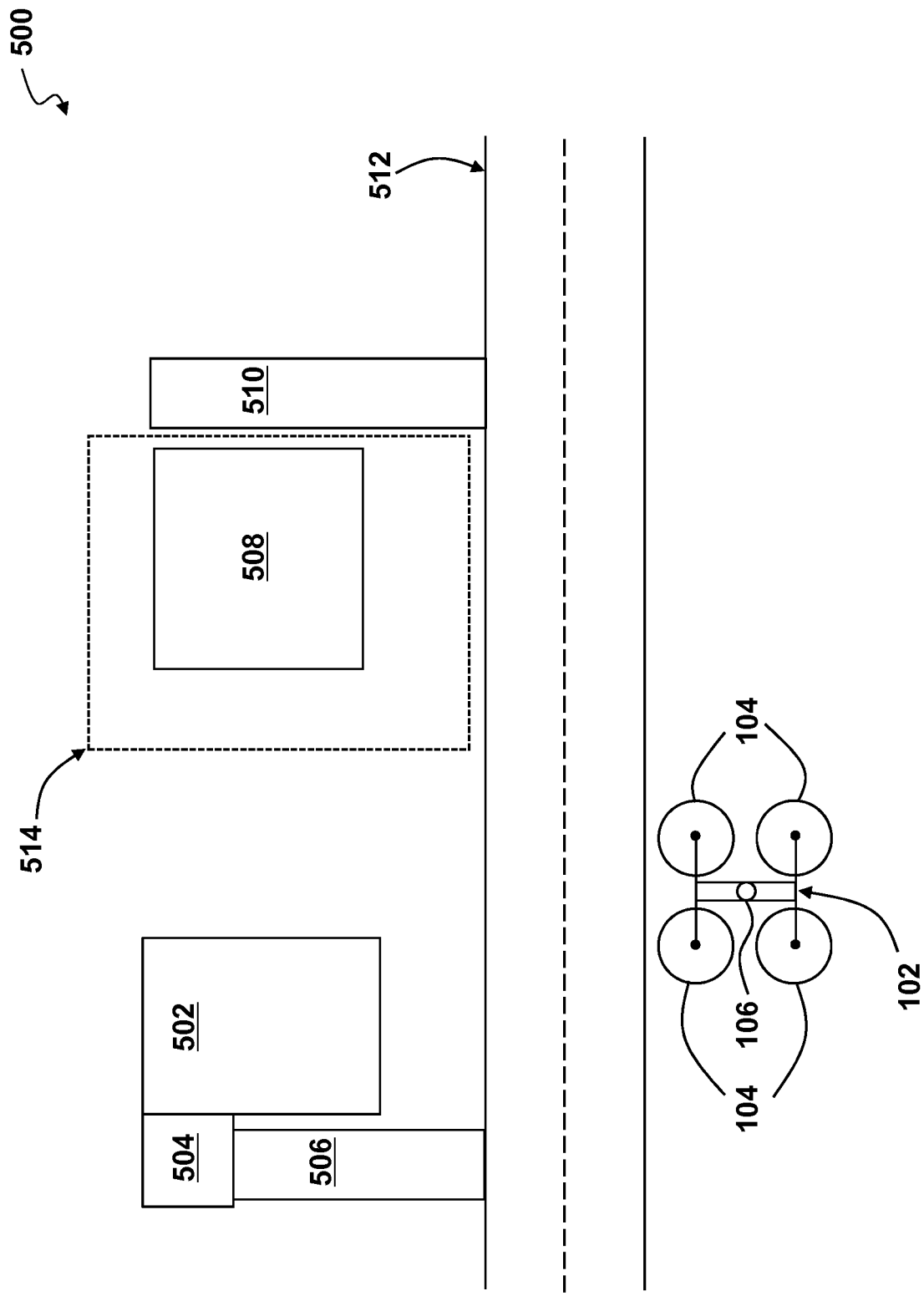
FIG. 5A depicts a UAV hovering over a landscape of a residential neighborhood with a selected geographical area.

FIG. 5A depicts a UAV 102 hovering over a landscape 500 of a residential neighborhood that includes selectable geographical areas for association with an operating mode. The UAV 102 may contain one or more propellers 104 to enable the UAV 102 to hover in a relatively stationary position. The UAV 102 may contain one or more imagers 106, e.g., a camera that may be supported by a gimbal mount. The landscape 500 includes a first house 502, a garage 504, and a first driveway 506. The landscape also includes a second house 508, a second driveway 510, and a road 512. An operator with a GCS may select one or more geographical areas 514. These one or more geographical areas 514 may be used to define areas that may be recorded by the UAV 102 camera 106, and areas that may not be recorded by the UAV 102 camera 106. A "look" mode only allows for video and/or metadata recording when the UAV 102 camera 106 is viewing an area inside the one or more selected geographical areas 514, i.e., video and/or metadata recording is not allowed outside of the one or more selected geographical areas 514. A "no look" mode only allows video recording when the UAV 102 camera 106 is viewing an area outside of the one or more selected geographical areas 514, i.e., video and/or metadata recording is not allowed inside the one or more selected geographical areas 514. In this way, an operator may quickly set restrictions on viewing and/or recording a UAV 102 video stream.

Figure 5B:
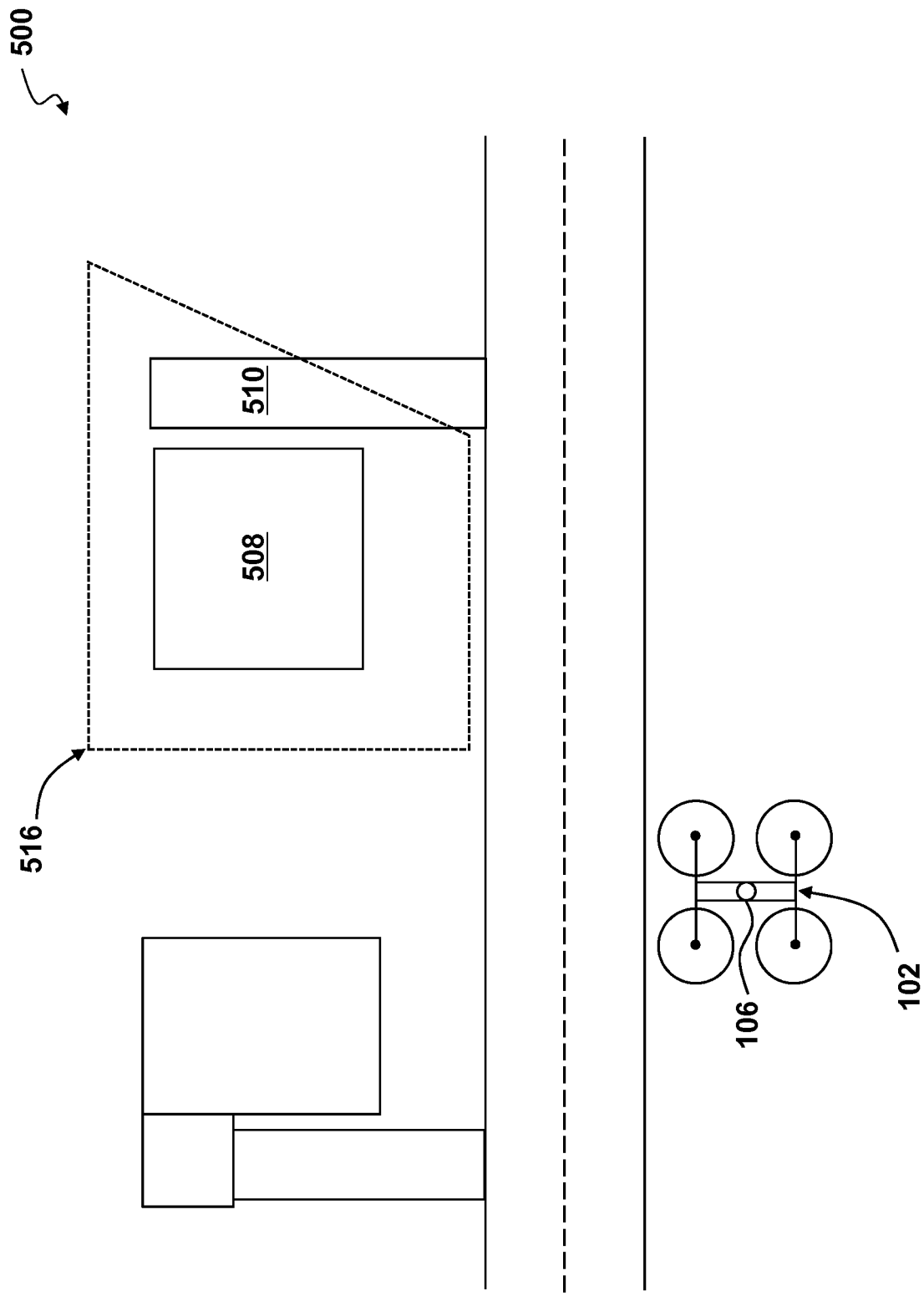
FIG. 5B depicts the UAV hovering over the landscape with a modified selected geographical area to include additional features of the landscape.

FIG. 5B depicts the UAV 102 and landscape 500 first illustrated in FIG. 5A, but illustrating a modified selected geographical area 516, which has been increased in size to include additional features. The operator of the GCS may modify the boundaries of the selected geographical area 514 (See FIG. 5A) by moving one or more points that make up the geographical area boundary. The geographical boundary of the modified selected geographical area 516 was modified to encompass part of the second driveway 510 in addition to the second house 508. The operator may be able to modify the modified selected geographical area 516 via a map display of a user interface of the GCS (See FIG. 3). In some embodiments, the modified selected geographical area 516 may appear either clear, shaded or covered to the operator such that the space within the modified selected geographical area 516 may or may not be visible to the operator of the GCS on a map. In other embodiments, the boundaries of the modified selected geographical area 516 may be set and/or modified by a non-graphical interface. While a four-sided polygon is used in this example, complex shapes may be used to select the modified selected geographical area 516.

Figure 5C:
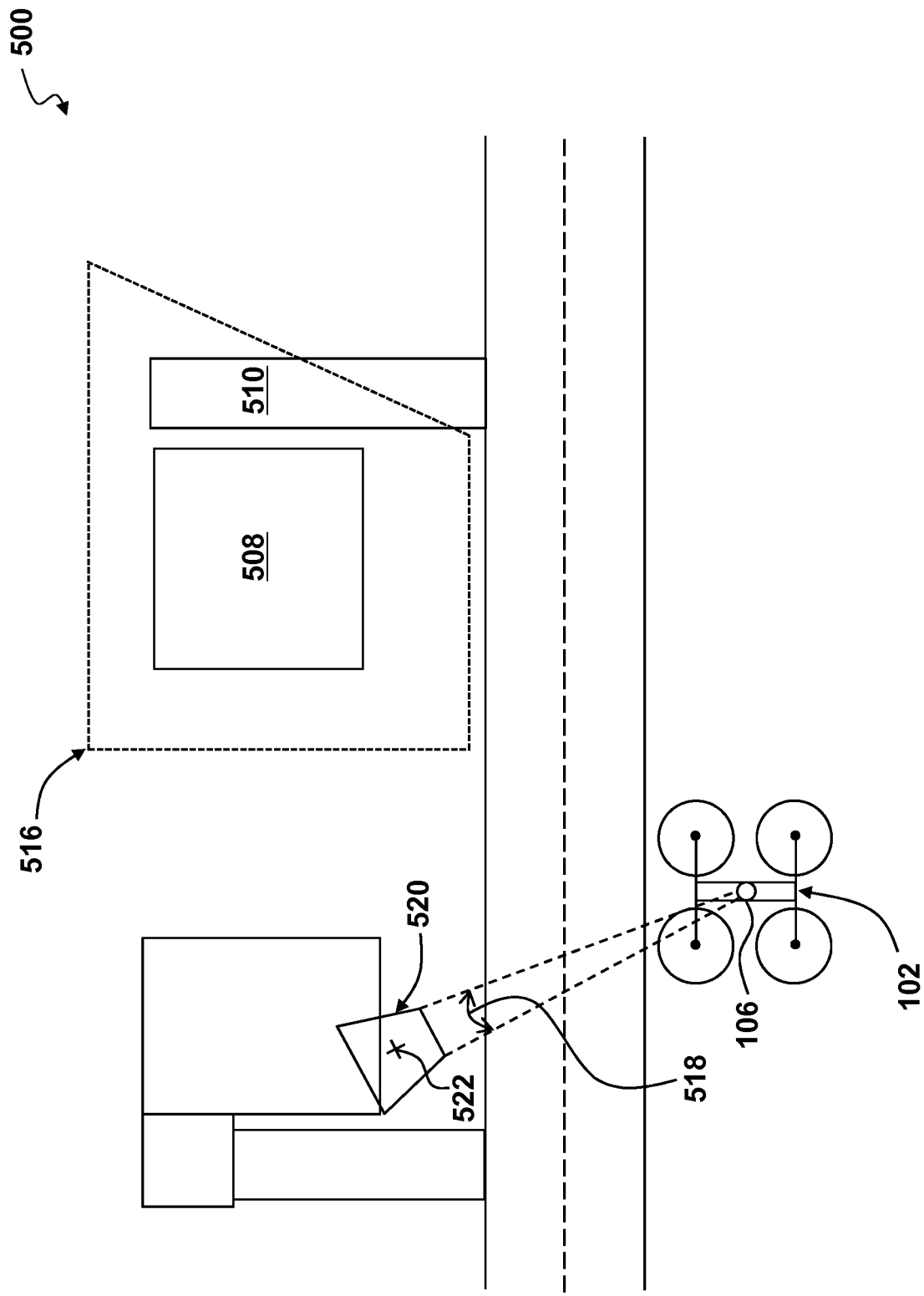
FIG. 5C depicts the UAV hovering over the landscape with a first viewing area outside of the selected geographical area in "no look" operating mode.

FIG. 5C depicts the UAV 102 hovering over the landscape 500 with a first viewing area 520 outside the modified selected geographical area 516 in "no look" operating mode. The UAV 102 imager 106, having a field of view (FOV) angle 518, is directed to a first viewing area 520 with a center field of view (CFOV) 522, i.e., an imaginary line from the center of a sensor of the imager 106 to a point on the landscape 500. Since this first viewing area 520 is outside of the "no look" modified selected geographical area 516, video and/or metadata from this first viewing area 520 may be broadcast by the UAV 102 and recorded by one or more user devices having proper permissions. In this example, every area in the landscape 500 outside of the modified selected geographical area 516 may have video and/or metadata recorded. However, if the GCS was set to "look" mode, then the first viewing area 520 may not have video and/or metadata recorded, because this first viewing area 520 is outside of the "look" modified selected geographical area 516.

Figure 5D:
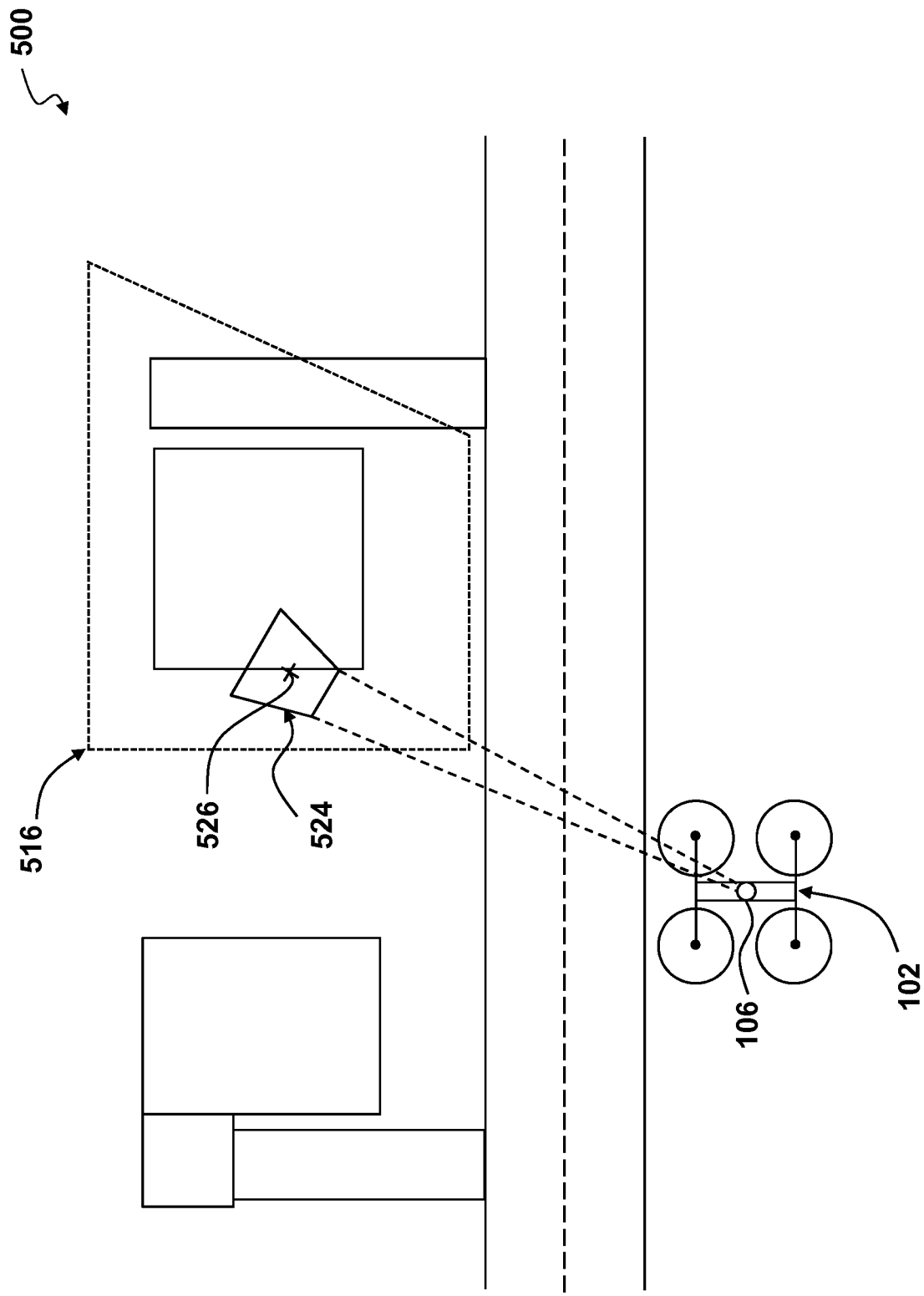
FIG. 5D depicts the UAV hovering over the landscape with a second viewing area in the selected geographical area in "no look" operating mode.

FIG. 5D depicts the UAV 102 hovering over the landscape 500 with a second viewing area 524 in the modified selected geographical area 516 in "no look" operating mode. In this example, the UAV 102 imager 106 has been moved such that the second viewing area 524 with a second center field of view 526 is inside the "no look" modified selected geographical area 516. Accordingly, video and/or metadata that is captured by the UAV 102 camera 106 in this second viewing area 524 may not be displayed to and/or recorded by one or more user devices. In some embodiments, the UAV 102 operator may be able to view video from the imager 106, but not record this video. This enables the operator to maintain situational awareness, while respecting privacy concerns. In some embodiments, the operator may record, via the GCS (See FIG. 3), metadata for areas viewed by the operator but not recorded by the GCS.

In embodiments the determination of whether the viewed area is within a selected geographic area may be done by determining the location of the center of the image (as noted above) and/or by determination of the location of the corner points of the viewed image (as done by the same process as described for the center point of the image).

Figure 5E:
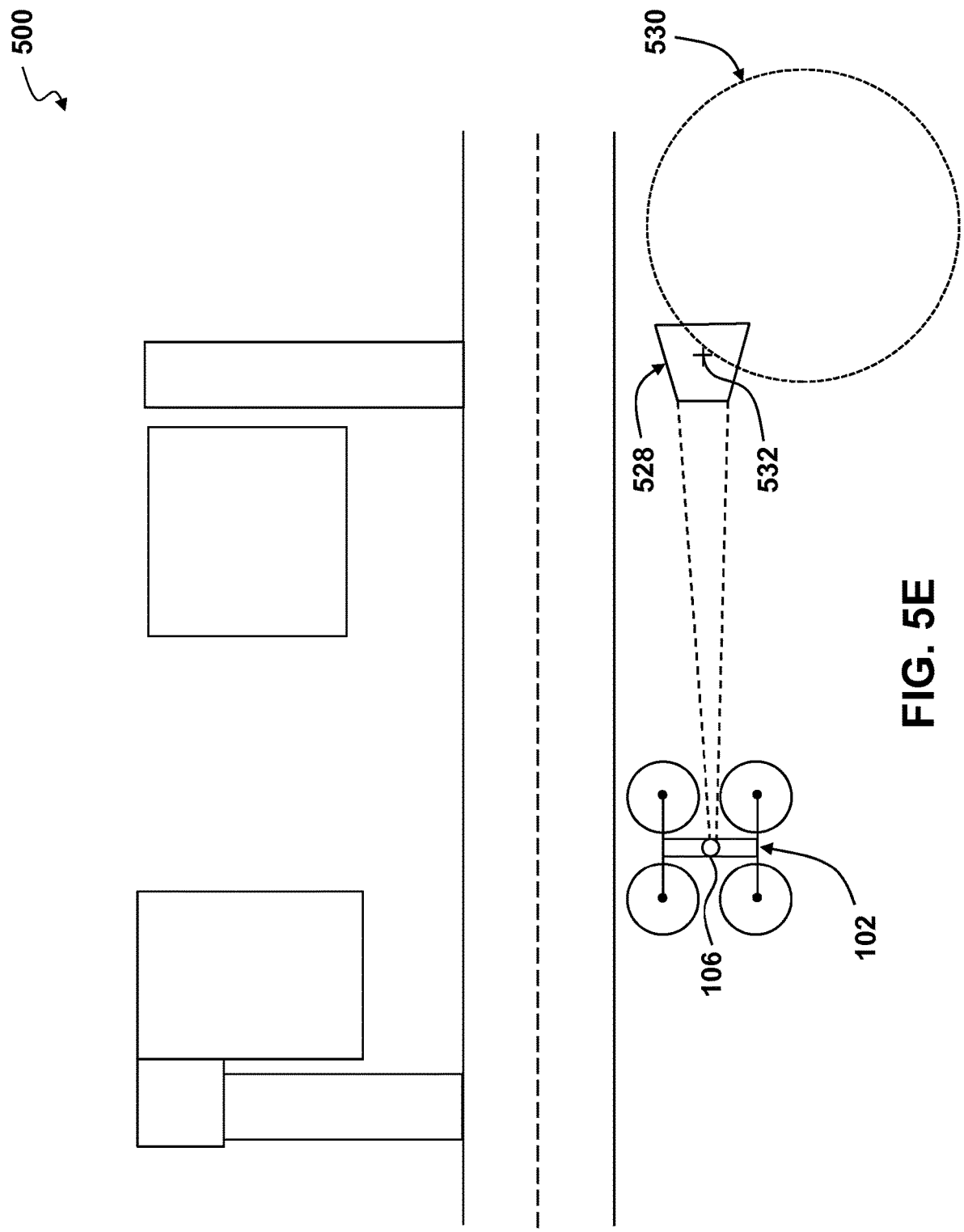
FIG. 5E depicts a UAV hovering over a landscape with a third viewing area partially in a new selected geographical area having a different boundary and in "no look" operating mode.

FIG. 5E depicts the UAV 102 hovering over the landscape 500 with a third viewing area 528 partially in a new selected geographical area 530 in "no look" operating mode. An operator with the GCS may select a new geographical area. This new selected geographical area 530 may be created by moving a previously selected geographical area to a new location or creating a new selected geographical area 530 with the GCS. This new selected geographical area 530 is a circle having a defined radius, but it may also be a polygon or complex shape. In this example, the UAV 102 imager 106 has been moved such that a third viewing area 528 with a center field of view 532 is partially inside the "no look" new selected geographical area 530, i.e., part of the third viewing area 528 is viewing an area where viewing and/or recording video and/or metadata is allowed and another part of the third viewing area 528 is viewing an area where viewing and/or recording video and/or metadata is not allowed. In some embodiments, a user may only record a portion of the video and/or metadata within this third viewing area 528 that is outside of the new selected geographical area 530. The portion of this third viewing area 528 that is inside of the new selected geographical area 530 that may not be viewed and/or recorded may not be displayed to one or more user devices and/or recorded. In other embodiments, if any portion of the viewing area 528 is in a selected geographical area that does not allow recording video and/or metadata, then a user may not be able to view or record any video and/or metadata so long as a portion of the viewing area 528 contains a portion of the selected geographical area that does not allow recording. In additional embodiments, whether a viewing area may be viewed and/or recorded may depend on the location of the center field of view 532 of the UAV 102 imager 106. If the center field of view of the UAV imager is in a geographical area that allows viewing and/or recording, then one or more user devices may be able to view and/or record the video and/or metadata. This center field of view approach may allow for less processing requirements, but may display portions of a geographical area that do not allow viewing and/or recording to one or more user devices. Preventing unintended viewing and/or recording of an area not desired to be viewed and/or recorded that utilizes the center field of view approach may be accomplished by broadening the borders of the selected geographical area by the operator of the GCS.

FIG. 6 depicts an exemplary functional block diagram of a "look" operating mode determination 600 for determining whether to enable or disable viewing and/or recording in a viewing area. The UAV, GCS, and/or one or more user devices may determine the geographical coordinates of the viewing area of a UAV imager (step 602). This determination may be based on a continual calculation of the geographical coordinates of the center of the field of view of the viewing area and/or the geographical coordinates of the four corners of the field of view of the video stream. In some embodiments, the viewable area may be defined based on center field of view and slant range from UAV position to center field of view Digital Terrain Elevation Data (DTET) altitude. Video viewing and/or recording may be re-enabled if the slant range is greater than a set distance, e.g., 1.5 km, even if that location is still within a selected geographical area, because the imager may not be able to adequately resolve images with clarity past this set distance. This set distance may be set by an operator or determined by the GCS and/or UAV based on the specifications of the imager lens, imager sensor, and/or video stream resolution. In some embodiments, the UAV, GCS, and/or one or more user devices may override an area where video recording has been disabled if it auto-detects an area defined as public domain, i.e., recording is allowed. This determination of public domain may be based on center field of view of the UAV camera, altitude of the UAV, optical capability of the UAV camera, and the location of the UAV. The UAV, GCS, and/or one or more user devices may continually determine whether the viewing area of the UAV camera is in a selected "look" geographical area (step 604). If the viewing area is in the selected "look" geographical area, then the UAV, GCS, and/or or one more user devices may enable viewing and/or recording for that viewing area (step 606). Then, the UAV, GCS, and/or one or more user devices may again determine the geographical coordinates of the viewing area (step 602). If the viewing area is not in the selected "look" geographical area, then the viewing and/or recording will be disabled for that viewing area (step 608). The UAV, GCS, and/or one or more user devices may then determine the geographical coordinates of the viewing area (step 602) and if those coordinates are not in a "look" area, then viewing and/or recording may remain disabled (step 608) until the geographical coordinates of the viewing area enter a selected "look" geographical area.

Figure 7:
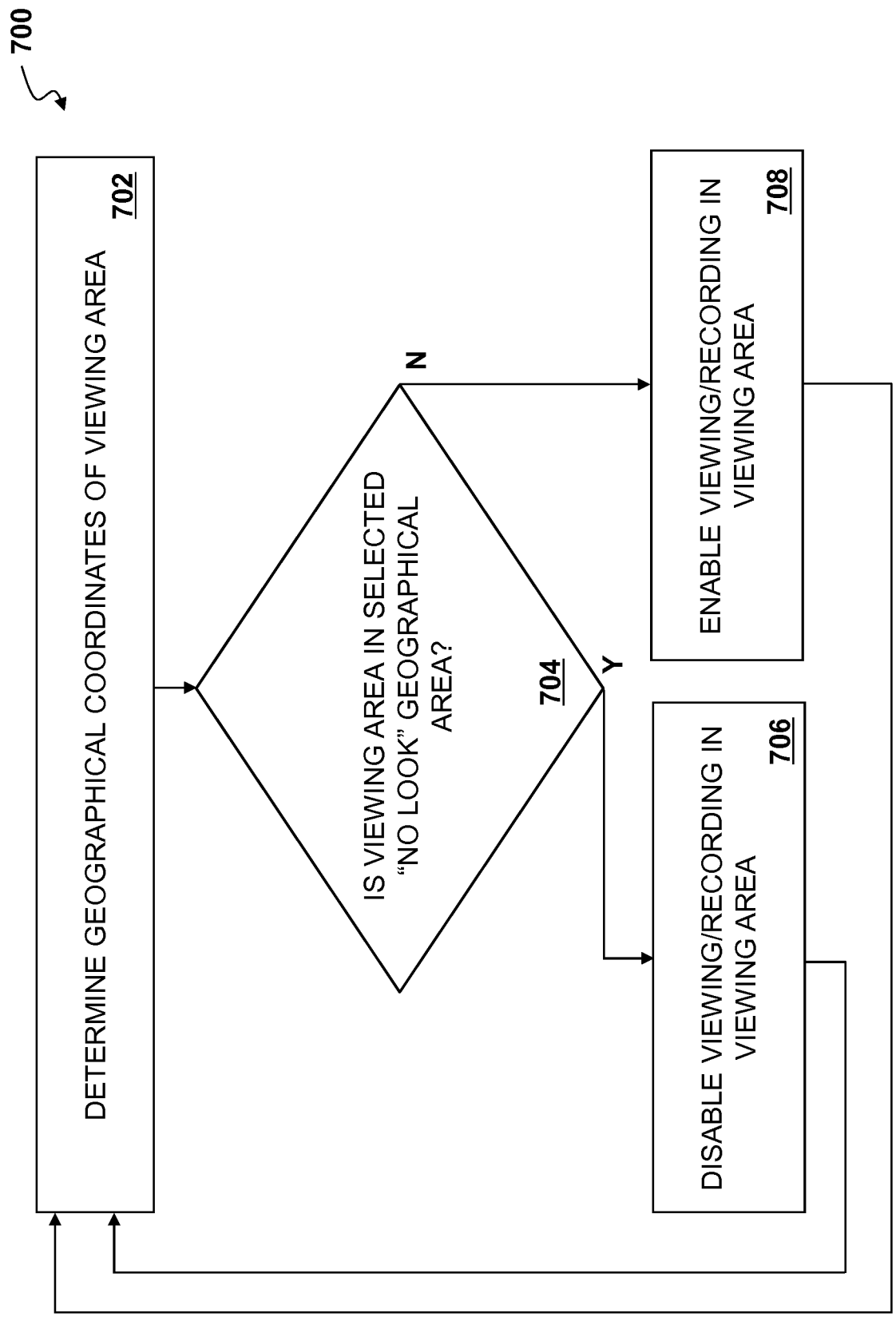
FIG. 7 depicts an exemplary functional block diagram of a "no look" operating mode determination to disable or enable recording or viewing within a selected geographical area.

FIG. 7 depicts an exemplary functional block diagram of a "no look" operating mode determination 700 for determining whether to enable or disable viewing and/or recording in a viewing area. The UAV, GCS, and/or one or more user devices may determine the geographical coordinates of the viewing area of a UAV imager (step 702). This determination may be based on a continual calculation of the geographical coordinates of the center of the field of view of the viewing area and/or the geographical coordinates of the four corners of the field of view of the video stream. The UAV, GCS, and/or one or more user devices may continually determine whether the viewing area of the UAV camera is in a selected "no look" geographical area (step 704). If the viewing area is in the selected "no look" geographical area, then the UAV, GCS, and/or one or more user devices may disable viewing and/or recording for that viewing area (step 706). Then, the UAV, GCS, and/or one or more user devices may again determine the geographical coordinates of the viewing area (step 702). If the viewing area is not in the selected "no look" geographical area, then the viewing and/or recording will be enabled (step 708), and may remain enabled until the geographical coordinates of the viewing area enter a selected "no look" geographical area.

Figure 8A:
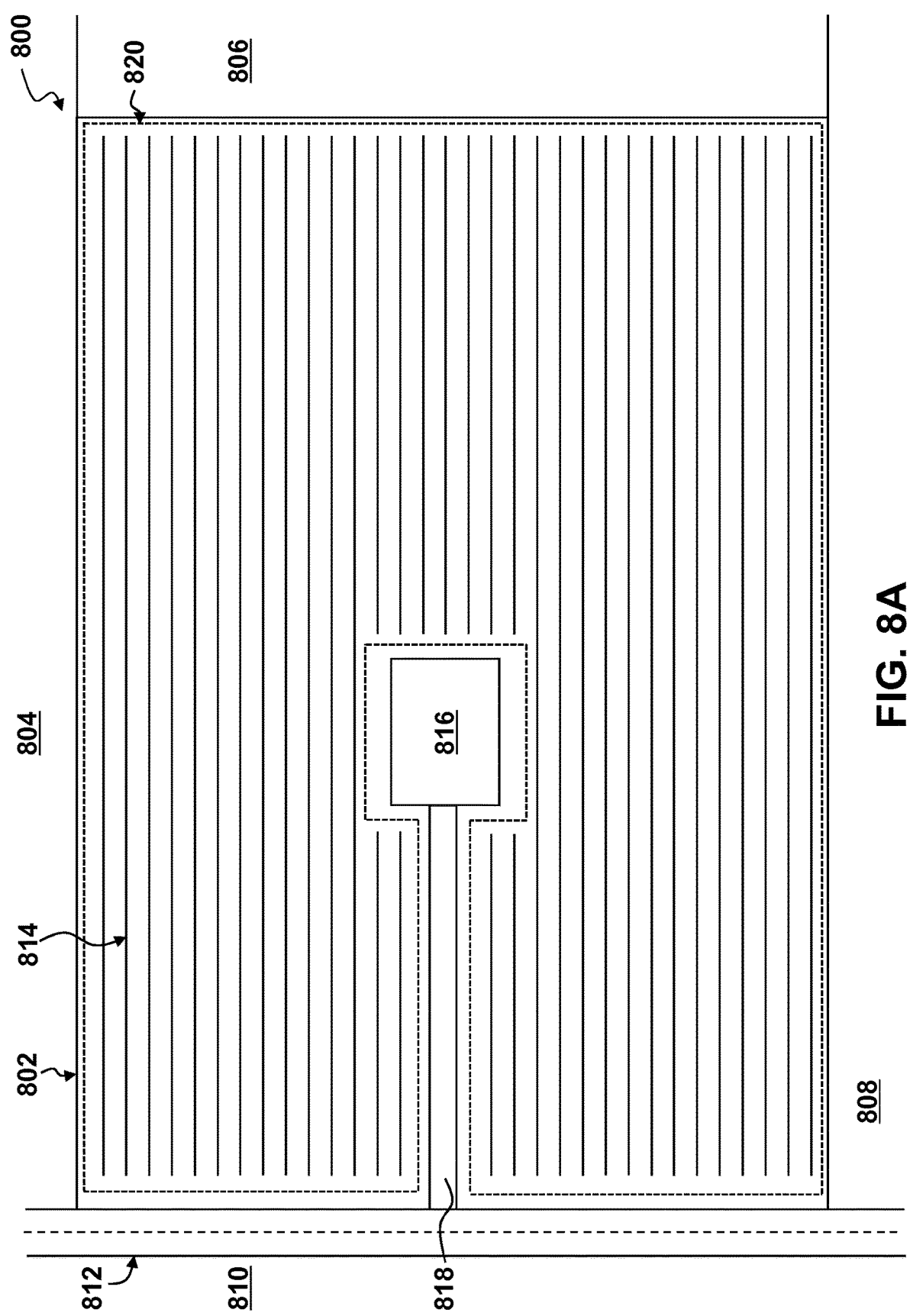
FIG. 8A depicts an exemplary "look" operating mode in an agricultural example of a farm having a house, driveway, and several surrounding property lots.

FIG. 8A depicts an exemplary "look" operating mode in an agricultural example 800 of a farm having surrounding lots and a road. An agricultural lot 802 is surrounded by adjacent lots 804 to the north, 806 to the east, 808 to the south, and 810 to the west and across a road 812. The agricultural lot has rows of crops 814, e.g., corn, wheat, etc.; a house 816; and a driveway 818. An operator, such as an owner of the agricultural lot 802 or a government agency, may desire to survey the crops 814 via a UAV, e.g., to determine the health of the crops 814. In order to only obtain information on the crops 814 of this agricultural lot 802, the operator may select a geographical area 820, which may be defined as geographic data, that encompasses these crops 814. This selected geographical area 814 does not include the house 816, driveway 818, or adjacent lots (804, 806, 808, 810) that may not belong to the owner of the agricultural lot 802. The operator may then select an operating mode to apply to the selected geographical area 820. If the operator selects a "look" mode, then the system will only allow viewing and/or recording UAV data having video and/or metadata inside the selected geographical area 820, i.e., the system will not view and/or record video of the house 816, driveway 818, road 812, and adjacent lots (804, 806, 808, 810). In some embodiments, the GCS, UAV, and/or one or more user devices may record an original video file. This original video file may then be processed to remove, blur, and/or obfuscate certain features, e.g., faces, license plates, windows, etc. For example, a face of a worker in the agricultural lot 802 may be blurred to hide his or her identity to those viewing the recorded processed video file.

Figure 8B:
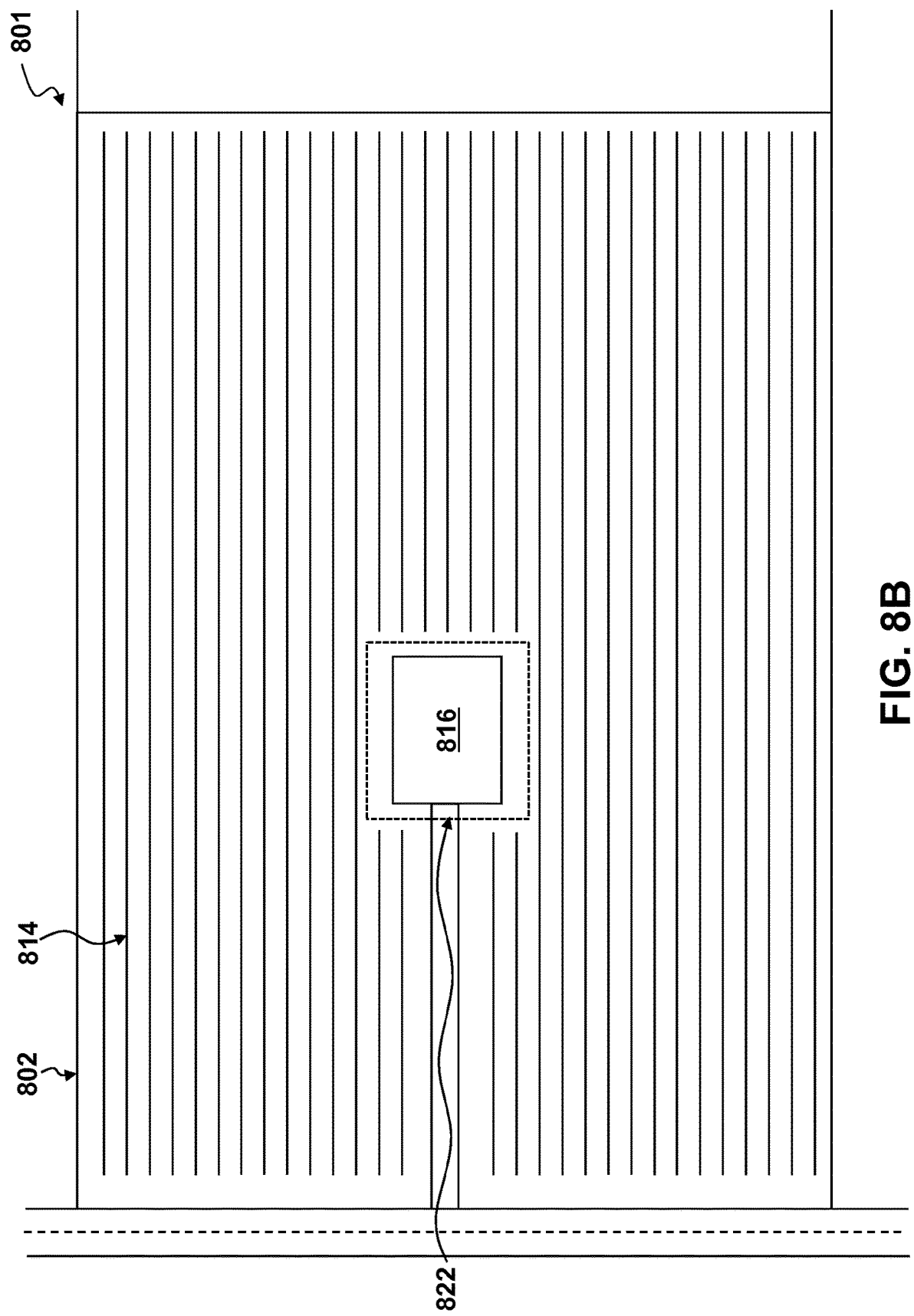
FIG. 8B depicts an exemplary do not record flag in the agricultural example surrounding the house in a middle of the farm.

FIG. 8B depicts an exemplary do not record flag in the agricultural example 801 surrounding the house on the farm. An owner of an agricultural lot 802 may not desire to have his or her house 816 viewed and/or recorded by a UAV. The owner may set a do not record flag 822 associated with a selected geographical location, which may be defined as geographic data, that they do not desire to be recorded by UAVs, e.g., a house 816. This do not record flag 822 may be part of a database that prohibits, prevents, and/or discourages UAV viewing and/or recording of an area where do not record flags are set. For example, a government may require surveying of crops 814 by a UAV for an agricultural survey. To prevent the UAV from viewing and/or recording an area that is not relevant to this requirement, e.g., the house 816, the owner of the house 816 may set the do not record flag 822. A UAV that references a database containing these do not record flags may avoid viewing and/or recording UAV data having video and/or metadata in the area of this do not record flag 822. In some embodiments, a UAV may record an original video file containing metadata of the locations viewed and/or recorded. This original video file may be post-processed to remove video and/or metadata of areas containing do not record flags. In some embodiments, this database may contain information, via metadata, on which areas have been viewed and/or recorded by a UAV. A user may be able to check to see if a specific area, e.g., a house 816, has been viewed and/or recorded; how many times it has been viewed and/or recorded; and when it was last viewed and/or recorded. This information may be accessed by confirming ownership of the specific area in question and/or through a Freedom of Information Act (FOIA) request.

Figure 9A:
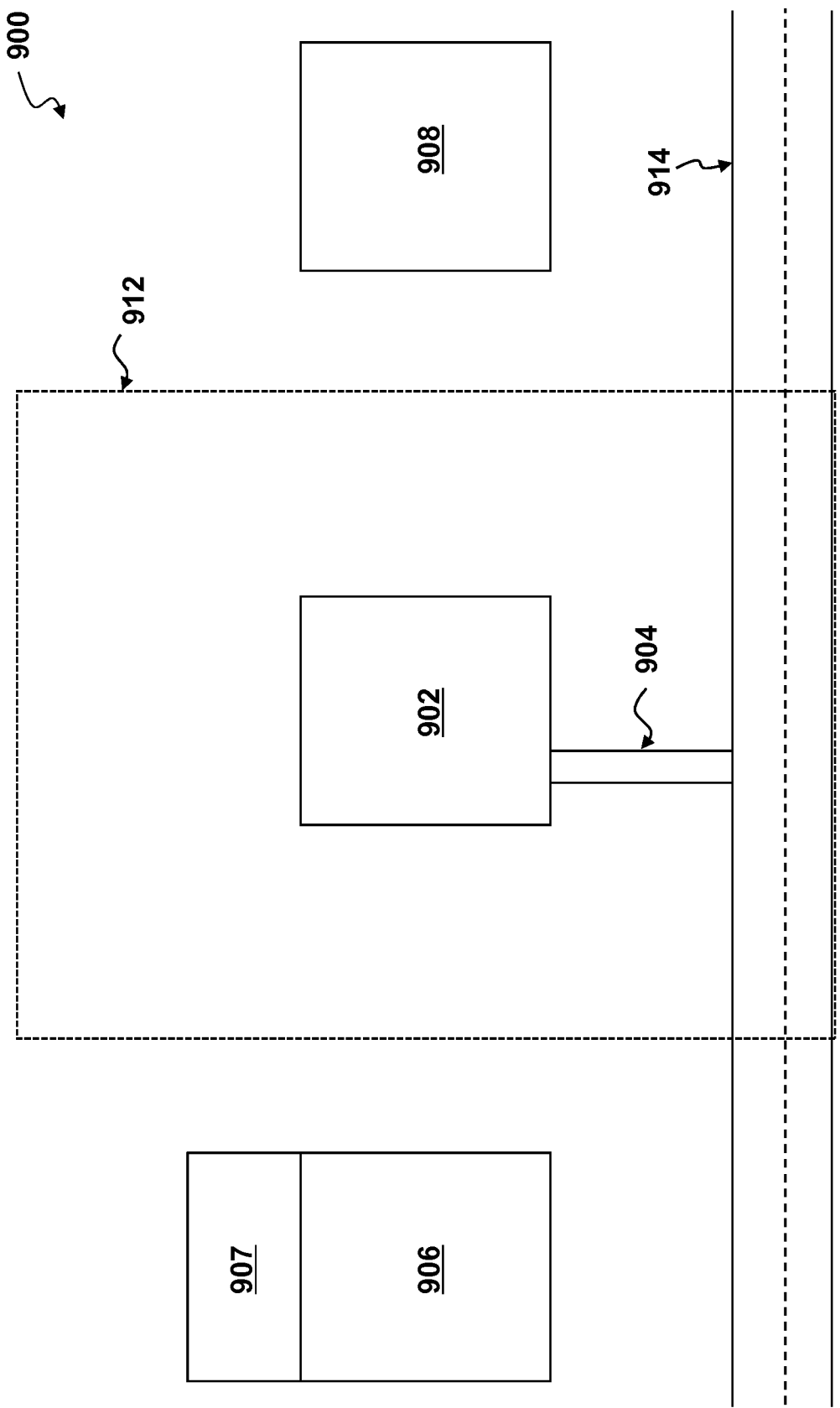
FIG. 9A depicts an exemplary "look" operating mode in a public safety example of a residential neighborhood having surrounding houses.

FIG. 9A depicts an exemplary "look" operating mode in a public safety example 900 in a neighborhood having multiple houses. In this example, a first house 902 having a walkway 904 is bordered by a second house 906 having an enclosed backyard 907 that is not visible from the ground, a third house 908, and a road 914. In this example, a warrant has been granted to search the first house 902. An operator, e.g., a police officer, has selected, by a GCS, a geographical area 912 and set the operating mode to "look" mode. The operator may be able to see parts of the neighboring houses (906, 907, 908) in order to maintain situational awareness of the UAV, but recording may be disabled if these neighboring houses (906, 907, 908) are in the field of view of the UAV imager to maintain privacy. An additional user, e.g., a news station, having a device such as a computer or tablet may receive a broadcast from the UAV for use in news reporting. When the UAV field of view is directed outside the selected geographical area 912, the news station may not be able to see or record the video stream from the UAV, e.g., the news station will be presented with a blank screen or a screen with a logo and/or message that viewing has been blocked. In this way, privacy of the neighboring houses (906, 907, 908) may be maintained. In some embodiments, the operator and/or the UAV may record an original video file that may be encrypted. This encrypted video file may be opened via a warrant or via one of authority to open such a file.

Figure 9B:
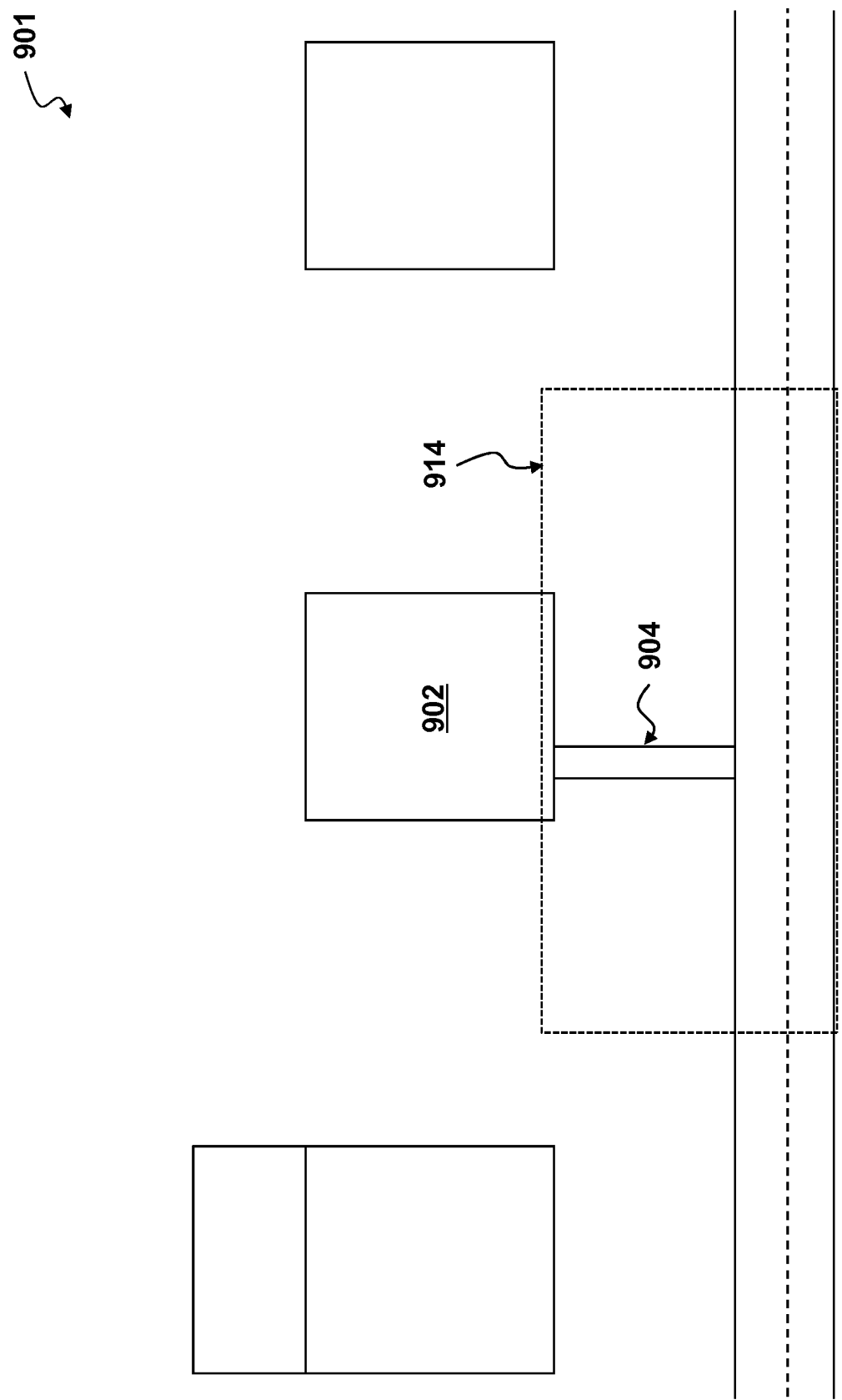
FIG. 9B depicts an exemplary "no look" operating mode in a public safety example of the residential neighborhood having surrounding houses.

FIG. 9B depicts an exemplary "no look" operating mode in a public safety example 901 where the selected geographical area encompasses part of the neighborhood. In this example, a warrant has been granted to enter the first house 902 and a Special Weapons and Tactics (SWAT) team is approaching the house by the walkway 904. An operator, e.g., a police officer, has selected, by a GCS, a geographical area 914 and set the operating mode to "no look" mode. An additional user, e.g., a news station, having a device such as a computer or tablet may receive a broadcast from the UAV for use in news reporting. It may be desired to not show the direction that the SWAT team is approaching the first house 902 on the news for safety reasons. By setting the operating mode to a "no look" mode, a news station may receive a blocked or blurred out video stream if the UAV imager field of view is inside the selected geographical area 914. In some embodiments, the selected geographical areas and/or operating modes may be combined to only view the first house 902 (See FIG. 9A), but not show the front of the first house 914 while the SWAT team is approaching it.

FIG. 10 illustrates an exemplary top level functional block diagram of a computing device embodiment of a GCS, UAV, post-processing computer, and/or one or more user devices 1000. The exemplary embodiment 1000 is shown as a computing device 1020 having a processor 1024, such as a central processing unit (CPU), addressable memory 1027, an external device interface 1026, e.g., an optional universal serial bus port and related processing, and/or an Ethernet port and related processing, and an optional user interface 1029 (See FIG. 3), e.g., an array of status lights and one or more toggle switches, and/or a display, and/or a keyboard and/or a pointer-mouse system and/or a touch screen. Optionally, the addressable memory 1027 may for example be: flash memory, eprom, and/or a disk drive or other hard drive. These elements may be in communication with one another via a data bus 1028. The processor 1024 may have an operating system 1025 such as one supporting a web browser 1023 and/or applications 1022, which may be configured to execute steps of a process according to the exemplary embodiments described herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
a processor and addressable memory, wherein the processor is configured to:
receive a geographic data defining a selected geographical area;
receive an operating mode associated with the selected geographical area, wherein the received operating mode restricts at least one of: a viewing of a UAV data and a recording of the UAV data by at least one user device when a field of view of a UAV imager is within the selected geographical area, and wherein the UAV imager is located outside of the selected geographical area; and
broadcast the UAV data to the at least one user device based on the selected geographical area and the received operating mode.

2. The system of claim 1 wherein the UAV data comprises at least one of: a video stream from the UAV imager and a metadata associated with the video stream from the UAV imager.

3. The system of claim 2 wherein the processor is further configured to:
determine the field of view of the UAV imager; and
determine if the field of view of the UAV imager is within the selected geographical area.

4. The system of claim 3 wherein the field of view of the UAV imager is based on a center field of view of the UAV.

5. The system of claim 3 wherein the field of view of the UAV imager is based on four corners of the video stream of the UAV imager.

6. The system of claim 3 wherein the received operating mode restricts viewing the UAV data, by the at least one user device, if any portion of the determined field of view of the UAV imager is within the selected geographical area.

7. The system of claim 3 wherein the received operating mode restricts viewing the UAV data, by the at least one user device, if no portion of the determined field of view of the UAV imager is within the selected geographical area.

8. The system of claim 3 wherein the received operating mode restricts viewing a portion of the UAV data, by the at least one user device, if the determined field of view of the UAV imager is partially within the selected geographical area and partially not within the selected geographical area, wherein the restricted viewing portion of the UAV data is one of: the field of view inside the selected geographical area and the field of view outside the selected geographical area.

9. The system of claim 3 wherein the received operating mode restricts recording the UAV data, by the at least one user device, if any portion of the determined field of view of the UAV imager is within the selected geographical area.

10. The system of claim 3 wherein the received operating mode restricts recording the UAV data, by the at least one user device, if any portion of the determined field of view of the UAV imager is not within the selected geographical area.

11. The system of claim 3 wherein the received operating mode restricts recording a portion of the UAV data, by the at least one user device, if the determined field of view of the UAV imager is partially within the selected geographical area and partially not within the selected geographical area, wherein the restricted recording portion of the UAV data is one of: the field of view inside the selected geographical area and the field of view outside the selected geographical area.

12. A method comprising:
selecting, by an operator of a Ground Control System (GCS) having a processor and addressable memory, a geographical area;
selecting, by the operator of the GCS, an operating mode to associate with the geographical area;
sending, by the operator of the GCS, the selected geographical area and selected operating mode to a processor of a UAV having addressable memory;
determining, by the processor of the UAV, a field of view of a UAV imager; and
broadcasting, by the processor of the UAV, a UAV data defining the selected geographical area, the selected operating mode, and the field of view of the UAV imager to at least one user device;
wherein the selected operating mode restricts at least one of: a viewing of the UAV data and a recording of the UAV data by the least one user device when the field of view of the UAV imager is within the selected geographical area, and wherein the UAV imager is located outside of the selected geographical area.

13. The method of claim 12 wherein the UAV data comprises at least one of: a video stream from the UAV imager and a metadata associated with the video stream from the UAV imager.

14. The method of claim 13 wherein the selected operating mode restricts viewing the UAV data, by the at least one user device, if the determined field of view of the UAV imager includes any area inside of the selected geographical area.

15. The method of claim 13 wherein the selected operating mode restricts viewing the UAV data, by the at least one user device, if the determined field of view of the UAV imager includes any area outside of the selected geographical area.

16. The method of claim 13 wherein the selected operating mode restricts viewing a portion of the UAV data, by the at least one user device, if the determined field of view of the UAV imager includes an area inside the selected geographical area and an area outside the selected geographical area, wherein the restricted portion of the UAV data is one of: the area inside the selected geographical area and the area outside the selected geographical area.

17. The method of claim 13 wherein the selected operating mode restricts recording the UAV data, by the at least one user device, if the determined field of view of the UAV imager includes any area inside of the selected geographical area.

18. The method of claim 13 wherein the selected operating mode restricts recording the UAV data, by the at least one user device, if the determined field of view of the UAV imager includes any area outside of the selected geographical area.

19. The method of claim 13 wherein the selected operating mode restricts recording a portion of the UAV data, by the at least one user device, if the determined field of view of the UAV imager includes an area inside the selected geographical area and an area outside the geographical area, wherein the restricted portion of the UAV data is one of: the area inside the selected geographical area and the area outside the selected geographical area.

20. The method of claim 13 further comprising:
selecting, by the operator of the GCS, a geographical point to direct a center field of view of the UAV imager.

21. The method of claim 13 further comprising:
inverting, by the operator of the GCS, any areas where at least one of: viewing of the UAV data and recording of the UAV data by the at least one user device are restricted with any areas where at least one of: viewing of the UAV data and recording of the UAV data by the at least one user device are allowed.

22. A system comprising:
a processor and addressable memory, wherein the processor is configured to:
receive, from at least one database, metadata containing information on one or more geographical areas where at least one UAV imager has at least one of: viewed the one or more geographical areas and recorded the one or more geographical areas;
receive, by a user, a geographic data defining a selected geographical area;
determine if the selected geographical area was at least one of: viewed and recorded based on the received metadata on one or more geographical areas;
receive, by the user, a request to prevent at least one of: viewing the selected geographical area and recording the selected geographical area by the at least one UAV imager; and
update the at least one database with the received request.

* * * * *